United States Patent
Kitamura

(10) Patent No.: US 10,562,141 B2
(45) Date of Patent: Feb. 18, 2020

(54) TOOL SWITCHING/HOLDING DEVICE AND ROBOT SYSTEM

(71) Applicant: Fanuc Corporation, Yamanashi (JP)

(72) Inventor: Ryouji Kitamura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/997,240

(22) Filed: Jun. 4, 2018

(65) Prior Publication Data
US 2019/0001451 A1 Jan. 3, 2019

(30) Foreign Application Priority Data
Jun. 28, 2017 (JP) .................. 2017-126591

(51) Int. Cl.
| | |
|---|---|
| B23Q 3/155 | (2006.01) |
| B25J 15/00 | (2006.01) |
| B23P 19/06 | (2006.01) |
| B25J 15/04 | (2006.01) |

(52) U.S. Cl.
CPC ........ B23Q 3/15506 (2013.01); B23P 19/069 (2013.01); B25J 15/0061 (2013.01); B25J 15/0066 (2013.01); B25J 15/0475 (2013.01); *Y10S 901/41* (2013.01)

(58) Field of Classification Search
CPC .. B25J 11/005; B25J 15/0019; B25J 15/0052; B25J 15/0066; B25J 15/04; B23Q 2039/002; B23Q 2039/006; B23Q 39/021; B23Q 39/022; B23Q 39/024; B23Q 3/155–1552; B23Q 2003/15527;
(Continued)

(56) References Cited

U.S. PATENT DOCUMENTS

| | | | |
|---|---|---|---|
| 4,666,367 | A | 5/1987 | Sticht |
| 2009/0132086 | A1 | 5/2009 | Hariki et al. |
| 2010/0180711 | A1 | 7/2010 | Kilibarda et al. |

(Continued)

FOREIGN PATENT DOCUMENTS

| | | |
|---|---|---|
| CN | 101434068 A | 5/2009 |
| CN | 206048233 U | 3/2017 |

(Continued)

OTHER PUBLICATIONS

Japan Patent Office, Decision to Grant a Patent dated Mar. 12, 2019 for Japan Patent Application No. 2017-126591.
(Continued)

*Primary Examiner* — Matthew P Travers
(74) *Attorney, Agent, or Firm* — Winstead PC

(57) ABSTRACT

Provided is a tool switching/holding device including: a base; a Y-axis slide base; a Y-axis actuator that moves the Y-axis slide base in a Y-axis direction; X-axis slide bases that are provided on the Y-axis slide base; tool mounting members that are provided on the X-axis slide bases and on which a tool is mounted; an X-axis actuator that selectively holds one of the tool mounting members and that moves the held tool mounting member in the X-axis direction; and retreating/locking sections that cause the tool mounting member other than the tool mounting member that is selectively held by the X-axis actuator to retreat to a position away from the X-axis actuator in the Y-axis direction or the X-axis direction and that lock the retreating tool mounting member.

8 Claims, 18 Drawing Sheets

(58) Field of Classification Search
CPC . B23Q 2003/15528–1553; B23P 19/06; B23P 19/069
See application file for complete search history.

(56) References Cited

U.S. PATENT DOCUMENTS

| | | |
|---|---|---|
| 2010/0241260 A1 | 9/2010 | Kilibarda et al. |
| 2011/0172788 A1 | 7/2011 | Kilibarda et al. |
| 2015/0016933 A1 | 1/2015 | Ochiishi |
| 2015/0088300 A1 | 3/2015 | Kilibarda et al. |
| 2015/0314436 A1* | 11/2015 | Reid ............... B25J 11/005 414/800 |
| 2017/0095937 A1 | 4/2017 | Williams |

FOREIGN PATENT DOCUMENTS

| | | |
|---|---|---|
| EP | 2060368 A1 | 5/2009 |
| JP | S62-181839 A | 8/1987 |
| JP | H02-185386 A | 7/1990 |
| JP | H06-270085 A | 9/1994 |
| JP | H06-320454 A | 11/1994 |
| JP | H07-037588 U | 7/1995 |
| JP | H07-299786 A | 11/1995 |
| JP | H08-243966 A | 9/1996 |
| JP | 2004-243431 A | 9/2004 |
| JP | 2015-013334 A | 1/2015 |
| JP | 2015-127071 A | 7/2015 |
| KR | 101453832 B1 | 10/2014 |
| WO | WO-2016-020973 A1 | 2/2016 |
| WO | WO-2017062583 A1 | 4/2017 |

OTHER PUBLICATIONS

Japan Patent Office, Search Report dated Feb. 8, 2019 for Japan Patent Application No. 2017-126591.
The State Intellectual Property Office of the People'S Republic of China; First Office Action in Chinese Application No. 201810649989.7; dated Jun. 18, 2019; 6 pages.

* cited by examiner

TOOL SWITCHING/HOLDING DEVICE AND ROBOT SYSTEM

CROSS-REFERENCE TO RELATED APPLICATIONS

This application is based on Japanese Patent Application No. 2017-126591, the contents of which are incorporated herein by reference.

TECHNICAL FIELD

The present invention relates to a tool switching/holding device and a robot system.

BACKGROUND ART

In the related art, there is a known tool exchange device that can hold a plurality of tools used for performing various types of work and that can exchange the tool to be used, according to the need.

As such a tool exchange device, there is a known structure in which a connector that is opened and closed by an actuator is provided in order to hold a tool (for example, see PTL 1).

In this structure, a protrusion (connector) provided on the tool is gripped by the connector of the tool exchange device, thus holding the tool. When the tool is exchanged, the connector is opened by the actuator to release the engagement with the tool held by the connector, and then the connector is closed by the actuator to hold another tool.

As the tool exchange device, there is also a known structure in which an expanding-diameter pin that pneumatically expands or contracts is provided in order to hold a tool (for example, see PTL 2).

In this structure, the diameter of the expanding-diameter pin is expanded while the expanding-diameter pin is inserted into a concave portion formed in the tool, thus holding the tool. When the tool is exchanged, the diameter of the expanding-diameter pin is reduced, and the expanding-diameter pin is pulled out from the concave portion in the tool, and then, the expanding-diameter pin is inserted into a concave portion in another tool, and the diameter thereof is expanded.

As the tool exchange device, for example, there is also a known structure in which a plurality of tools are held by a turret that is held so as to be rotatable about a turret axis (for example, see PTL 3).

In this structure, a hand exchange device transfers rotation about an actuating axis of a robot to the turret axis, thus rotating the turret and moving a required tool to a work position.

CITATION LIST

Patent Literature

{PTL 1} Japanese Unexamined Patent Application, Publication No. Hei 7-299786
{PTL 2} Japanese Unexamined Patent Application, Publication No. 2015-127071
{PTL 3} Japanese Unexamined Utility Model Application, Publication No. Hei 7-37588

SUMMARY OF INVENTION

Technical Problem

An object of the present invention is to provide a tool switching/holding device and a robot system in which tool exchange can be efficiently performed even with a simple structure.

Solution to Problem

According to one aspect, the present invention provides a tool switching/holding device including: a base; a first member that is provided so as to be movable along a first-axis direction with respect to the base; a first actuator that moves the first member in the first-axis direction with respect to the base; a plurality of second members that are provided on the first member and that are each supported so as to be movable in a second-axis direction perpendicular to the first-axis direction; tool mounting members that are provided on the respective second members and on each of which a tool is mounted; a second actuator that selectively holds one of the tool mounting members, which are provided on the plurality of second members, respectively, and that moves the held tool mounting member in the second-axis direction; and a plurality of retreating/locking sections that cause, of the plurality of tool mounting members, the tool mounting member other than the tool mounting member that is selectively held by the second actuator, to retreat to a position away from the second actuator in the first-axis direction or the second-axis direction and that each lock the retreating tool mounting member.

In the above-described aspect, the tool mounting members may each have an insertion hole penetrating therethrough in the first-axis direction; the second actuator may be provided with a holding pin that extends in the first-axis direction and that can be inserted into the insertion holes of the tool mounting members; and the retreating/locking sections may be each provided with a locking pin that extends in the first-axis direction and that can be inserted into the insertion holes of the tool mounting members.

In the above-described aspect, the locking pins may be provided so as to be positioned coaxially with the holding pin, on both sides of the holding pin when the second actuator positions the holding pin at a prescribed position in the second-axis direction.

In the above-described aspect, the tool mounting members may each have, in an outer periphery of the insertion hole, a notch portion with which interference with the second actuator is avoided during movement thereof in the first-axis direction in accordance with movement of the first member in the first-axis direction.

In the above-described aspect, the first actuator may be a servomotor.

According to another aspect, the present invention provides a robot system including: a robot that has an arm to be operated on the basis of a computer program set in advance; the above-described tool switching/holding device, which is mounted on a distal end portion of the arm; and a control unit that controls at least the operations of the first actuator and the second actuator of the tool switching/holding device.

In the above-described aspect, the second members and the tool mounting members may be provided in two pairs; the two retreating/locking sections may be provided; when the control unit causes the second actuator to hold one of the tool mounting members in the two pairs, the control unit may cause the other tool mounting member to be locked by one of the two retreating/locking sections; and, when the control unit causes the second actuator to hold the other tool mounting member in the two pairs, the control unit may cause said one tool mounting member to be locked by the other one of the two retreating/locking sections.

In the above-described aspect, the second members and the tool mounting members may be provided in three pairs; the two retreating/locking sections may be provided; when the control unit causes the second actuator to hold a first tool mounting member, among the tool mounting members in the three pairs, the control unit may cause second and third tool mounting members to be locked by one of the two retreating/locking sections; when the control unit causes the second actuator to hold the second tool-mounting member, among the tool mounting members in the three pairs, the control unit may cause the first tool mounting member to be locked by the other one of the two retreating/locking sections and causes the third tool mounting member to be locked by said one of the two retreating/locking sections; and, when the control unit causes the second actuator to hold the third tool mounting member, among the tool mounting members in the three pairs, the control unit may cause the first and second tool-mounting members to be locked by the other one of the two retreating/locking sections.

DESCRIPTION OF EMBODIMENTS

A tool switching/holding device 10 and a robot system 1 according to a first embodiment of the present invention will be described below with reference to the drawings.

First Embodiment

Figure 1:
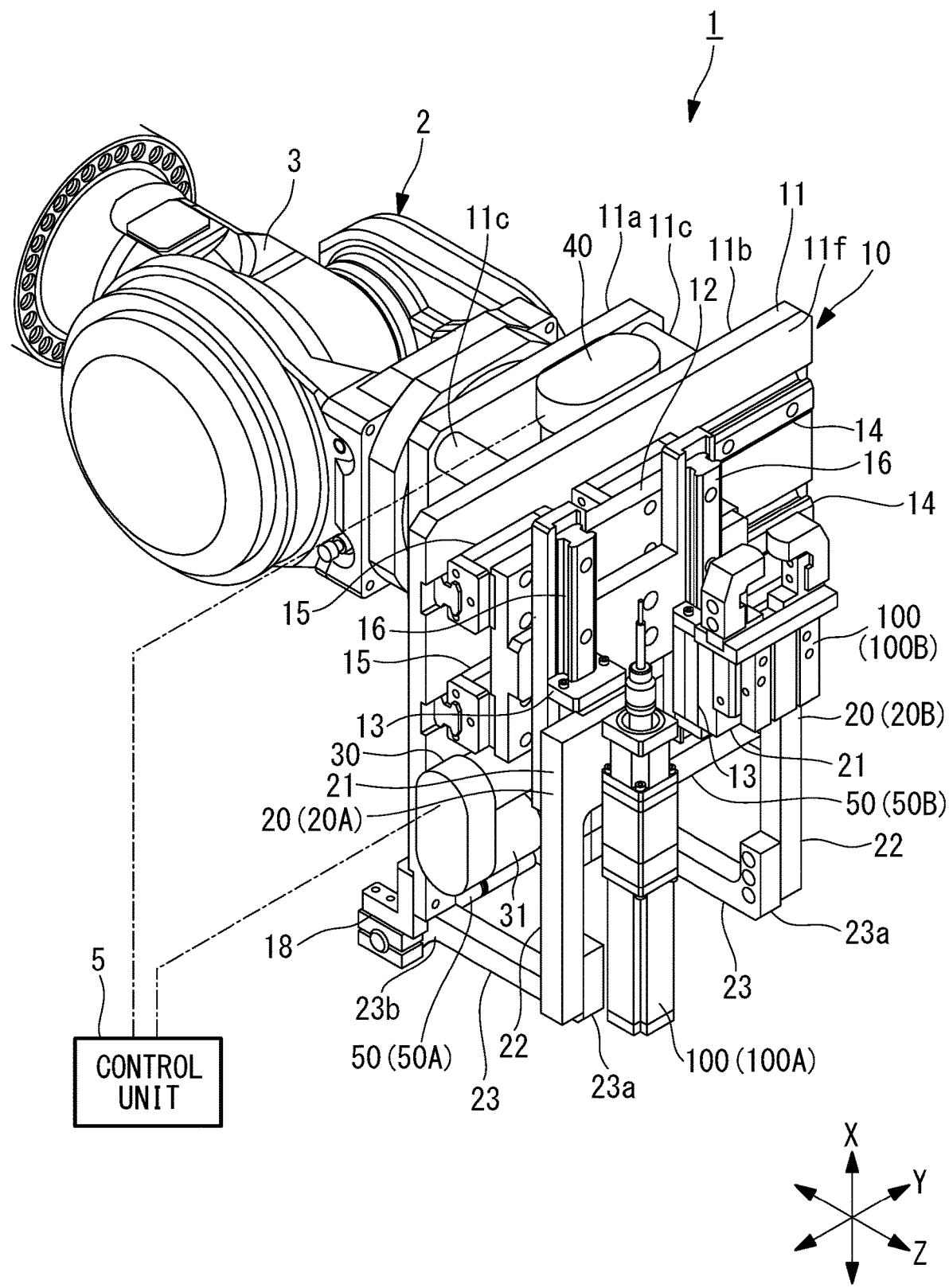
FIG. 1 is a perspective view showing a tool switching/holding device according to a first embodiment of the present invention.

As shown in FIG. 1, a robot system 1 of this embodiment is provided with: a robot 2 that has an arm 3; the tool switching/holding device 10, which is mounted at a distal end portion of the arm 3 of the robot 2; and a control unit 5.

The robot 2 is provided with: a base (not shown) that is provided on a floor surface; and the multi-axis multi-joint arm 3, which is provided on the base. The robot 2 operates the arm 3, the tool switching/holding device 10, and tools 100 that are held by the tool switching/holding device 10, on the basis of a program taught in advance, thus causing them to automatically perform predetermined work.

As shown in FIGS. 1 to 4, the tool switching/holding device 10 holds the plurality of tools 100 and moves each of the tools 100, for example, in an X-axis direction along the vertical direction and in a Y-axis direction along the horizontal direction in FIG. 1.

The tool switching/holding device 10 is provided with: a base 11; a Y-axis slide base (first member) 12; X-axis slide bases (second members) 13; tool mounting members 20; a Y-axis actuator (first actuator) 30; an X-axis actuator (second actuator) 40; and retreating/locking sections 50.

The base 11 is fixed to the distal end portion of the arm 3 of the robot 2. The base 11 is provided with: a plate-like first base member 11a that is fixed to the distal end portion of the arm 3; a second base member 11b that is disposed parallel to the first base member 11a with a gap therebetween; and a plurality of coupling members 11c that couple the first base member 11a and the second base member 11b. The second base member 11b is provided with, on a front surface 11f thereof facing toward the opposite side from the first base member 11a thereof, for example, two Y-axis guide rails 14, constituting a pair, that are formed of linear guides. The two Y-axis guide rails 14 are parallel to each other and extend in a predetermined direction along the front surface 11f of the second base member 11b (hereinafter, this direction is referred to as Y-axis (first axis)).

The Y-axis slide base 12 is provided via slide members 15 that are slidingly movable along the Y-axis guide rails 14. The Y-axis slide base 12 is formed in a plate-like shape, is disposed parallel to the second base member 11b, and is supported so as to be slidingly movable in the Y-axis direction.

In FIG. 1, the Y-axis actuator 30 is provided below the Y-axis slide base 12. The Y-axis actuator 30 is provided with: a body 31 that is provided with a servomotor 31a and that is fixed to the Y-axis slide base 12; and a rod 32 (see FIG. 3) that is advanced or retracted along the Y-axis direction through actuation of the body 31. A distal end portion of the rod 32 is coupled to the Y-axis slide base 12 via a bracket 33. The Y-axis actuator 30 actuates the body 31 to advance or retract the rod 32 in the Y-axis direction, thus moving the Y-axis slide base 12 in the Y-axis direction with respect to the base 11.

The Y-axis slide base 12 is provided with X-axis guide rails 16 that run along the front surface 11f of the second base member 11b and that extend in an X-axis (second axis) direction perpendicular to the Y-axis. In this embodiment, the two X-axis guide rails 16 are provided with a gap therebetween in the Y-axis direction.

The X-axis slide bases 13 are independently provided on the two X-axis guide rails 16, respectively. The X-axis slide bases 13 are provided so as to be slidingly movable along the corresponding X-axis guide rails 16.

The tool mounting members 20 are provided on the respective X-axis slide bases 13. The tool mounting members 20 are each provided with a mounting base section 21, an arm section 22, and a support arm 23.

The mounting base sections 21 are fixed to the respective X-axis slide bases 13. The appropriate tools 100 are mounted on the mounting base sections 21 with bolts or the like. In this embodiment, as a first tool 100A, a nut runner for fastening a bolt and a nut is mounted on the mounting base section 21 of a first tool-mounting member 20A, which is one of the tool-mounting members, and, as a second tool 100B, a hand for gripping parts etc. is mounted on the mounting base section 21 of a second tool-mounting member 20B, which is the other tool-mounting member.

The arm section 22 is formed integrally with the mounting base section 21 and is formed so as to extend downward in the X-axis direction from the mounting base section 21, in the example shown in FIG. 1.

Figure 2:
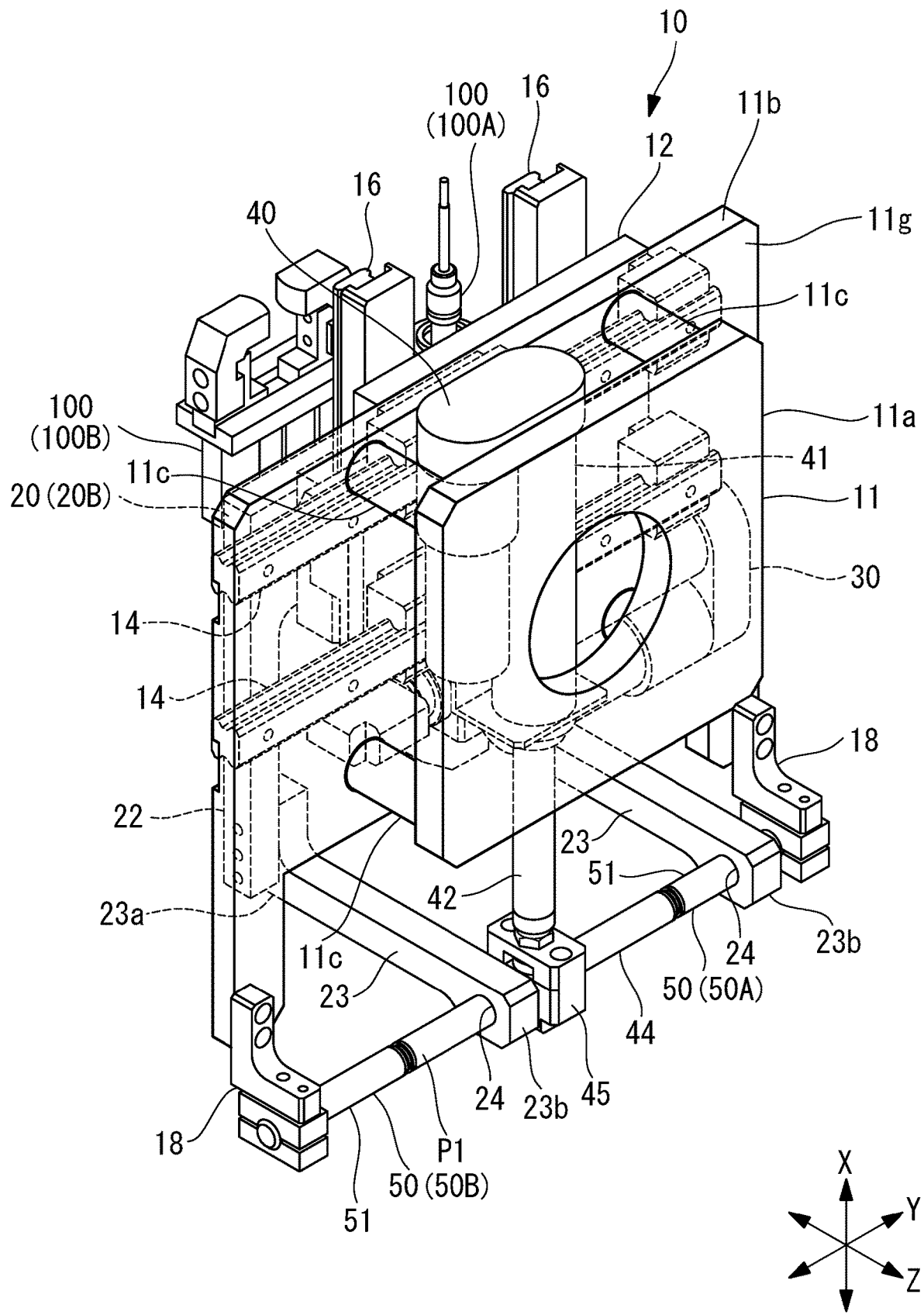
FIG. 2 is a perspective view of the tool switching/holding device shown in FIG. 1, as viewed obliquely from the rear.
Figure 4:
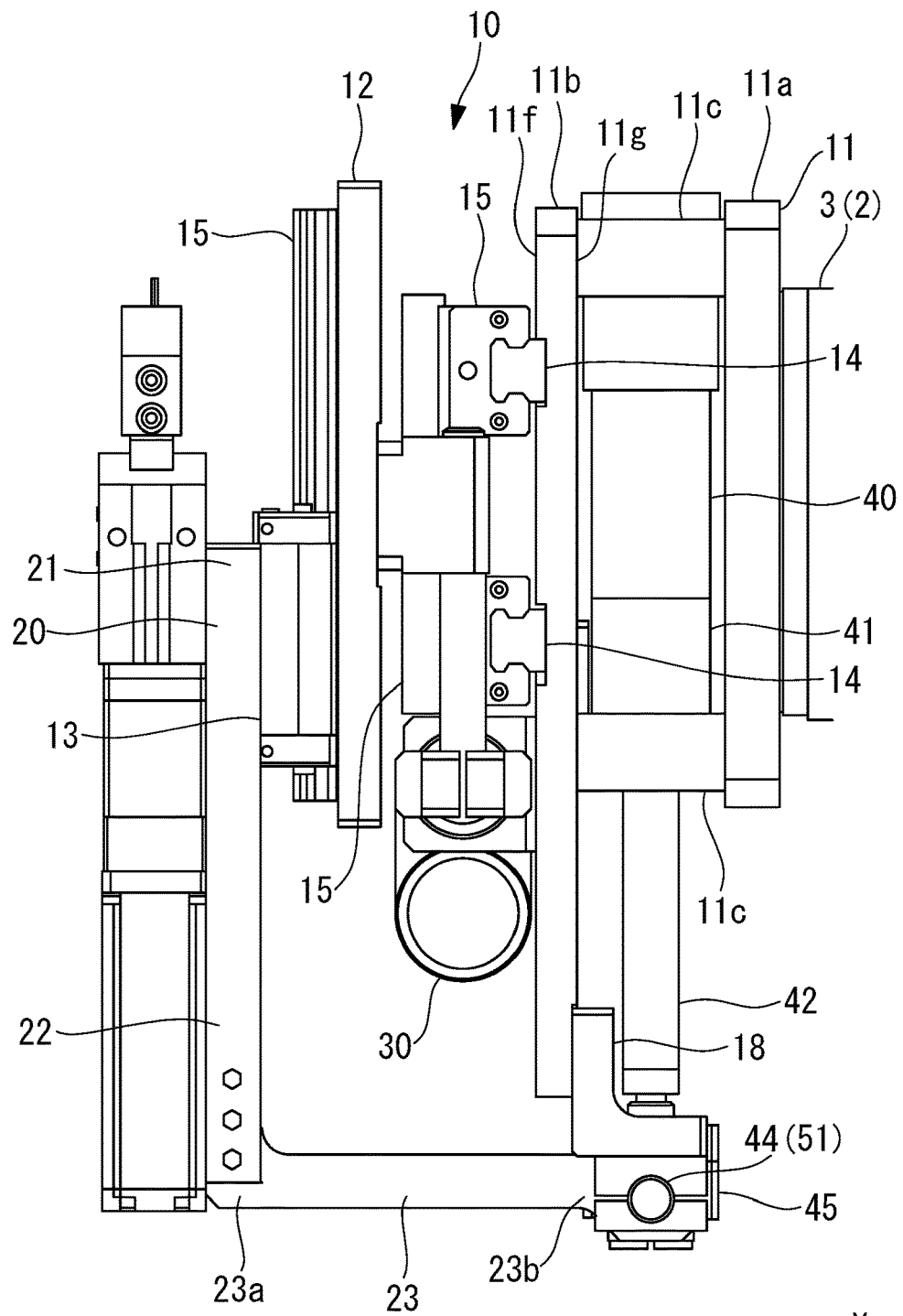
FIG. 4 is a side view of the tool switching/holding device shown in FIG. 3.
Figure 5:
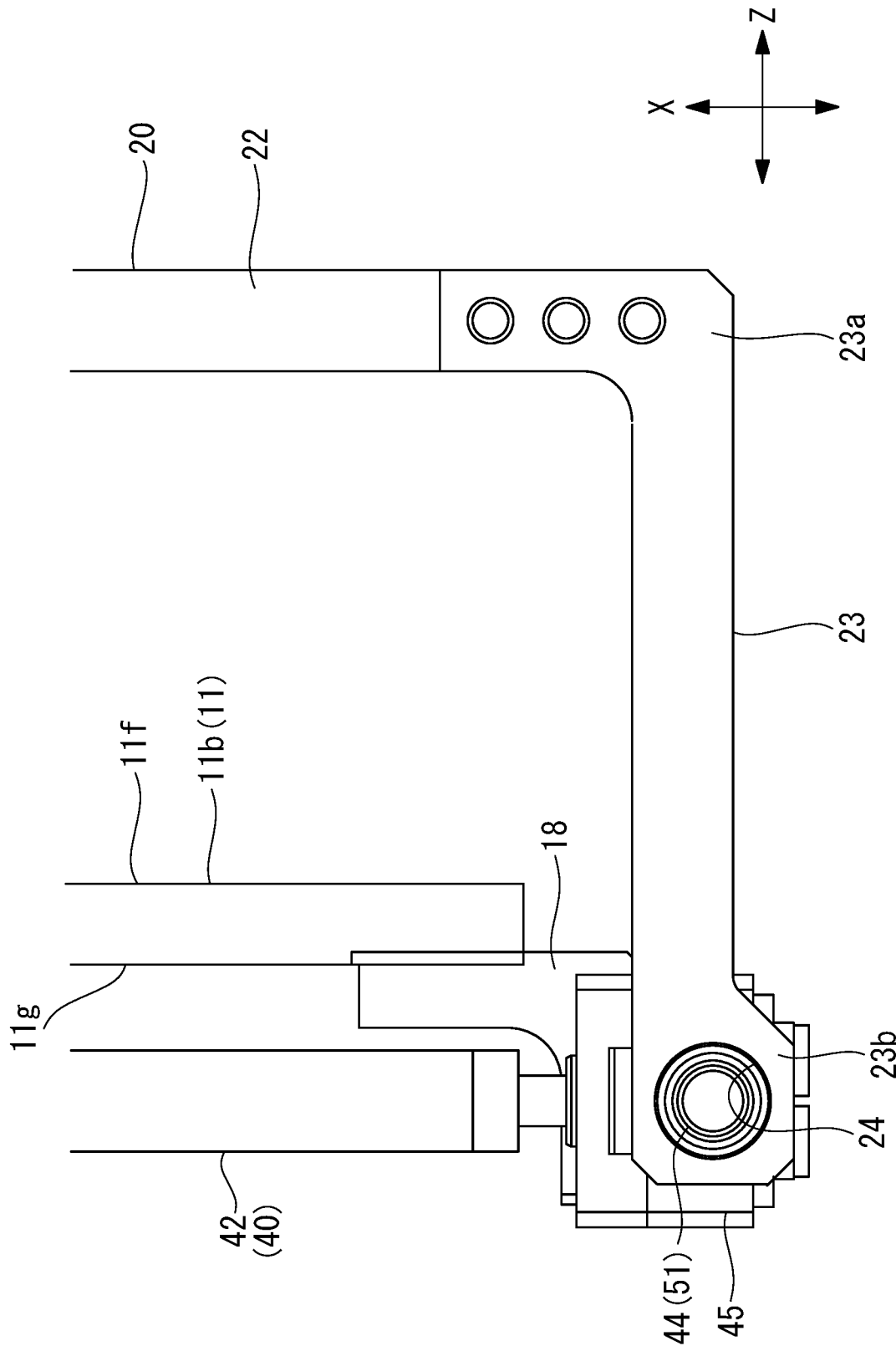
FIG. 5 is a side view showing a support arm of the tool switching/holding device shown in FIG. 1.

Base sections 23a of the support arms 23 are coupled to lower ends of the arm sections 22. As shown in FIGS. 2, 4, and 5, the support arms 23 are provided so as to extend toward the second base member 11b in the Z-axis direction perpendicular to the X-axis direction and the Y-axis direction and such that distal end sections 23b thereof protrude so as to be closer to the first base member 11a than the second base member 11b is. Insertion holes 24 that penetrate the support arms 23 in the Y-axis direction are formed in the distal end sections 23b of the support arms 23.

The X-axis actuator 40 is provided on a rear surface 11g of the second base member 11b that faces the opposite side from the front surface 11f. As shown in FIG. 2, the X-axis actuator 40 is provided with: a body 41 that is provided with a servomotor 41a; and a rod 42 that is advanced or retracted along the X-axis direction with respect to the body 41 through actuation of the body 41. The X-axis actuator 40 is provided with, at a distal end portion of the rod 42 and via the bracket 45, a holding pin 44 that selectively holds one of the plurality of tool mounting members 20 (the first tool-mounting member 20A and the second tool-mounting member 20B), which are provided on the plurality of X-axis slide bases 13. The holding pin 44 extends along the Y-axis direction, and a center section thereof in the length direction is coupled to the rod 42. Specifically, the holding pin 44 protrudes toward both sides in the Y-axis direction with respect to the rod 42. The holding pin 44 has an outer diameter slightly smaller than the inner diameters of the insertion holes 24, which are provided in the support arms 23, and can be inserted into the insertion holes 24.

The X-axis actuator 40 actuates the body 41 to advance or retract the rod 42 in the X-axis direction, thus moving the holding pin 44, which is provided at the distal end portion of the rod 42, along the X-axis direction. Here, the X-axis actuator 40 selectively holds one of the plurality of tool mounting members 20 by means of the rod 42. Specifically, the holding pin 44 is inserted into the insertion hole 24 that is formed in the support arm 23 of one of the tool mounting members 20, thereby causing the rod 42 to hold said one tool mounting member 20. In this state, when the body 41 is actuated to advance or retract the rod 42 in the X-axis direction, the tool 100 (the first tool 100A or the second tool 100B) that is mounted on the first tool-mounting member 20A or the second tool-mounting member 20B is driven so as to advance or retract in the X-axis direction.

The retreating/locking sections 50 include a first retreating/locking section 50A and a second retreating/locking section 50B. The first retreating/locking section 50A and the second retreating/locking section 50B are disposed on both sides of the holding pin 44 of the X-axis actuator 40 in the Y-axis direction.

The first retreating/locking section 50A and the second retreating/locking section 50B are each provided with a locking pin 51. The locking pins 51 extend in the Y-axis direction and are fixed to the second base member 11b via brackets 18. The locking pin 51 of the first retreating/locking section 50A, which is located at one side in the Y-axis direction, and the locking pin 51 of the second retreating/locking section 50B, which is located at the other side in the Y-axis direction, are coaxially provided at the same position in the X-axis direction and the Z-axis direction. The locking pins 51 each have an outer diameter slightly smaller than the inner diameters of the insertion holes 24, which are provided in the support arms 23, and can be inserted into the insertion holes 24.

The locking pin 51 of the first retreating/locking section 50A and the locking pins 51 of the second retreating/locking section 50B are provided so as to be continuous with the holding pin 44 along the Y-axis direction when the body 41 of the X-axis actuator 40 is actuated to move the rod 42 and to position the holding pin 44 at a prescribed position (hereinafter, referred to as retracted-end position P1) in the X-axis direction.

In the tool switching/holding device 10, the Y-axis actuator 30 moves the Y-axis slide base 12 in the Y-axis direction, thus causing the X-axis actuator 40 to selectively hold one of the plurality of tool-mounting members, i.e., the first tool-mounting member 20A and the second tool-mounting member 20B.

Figure 6:
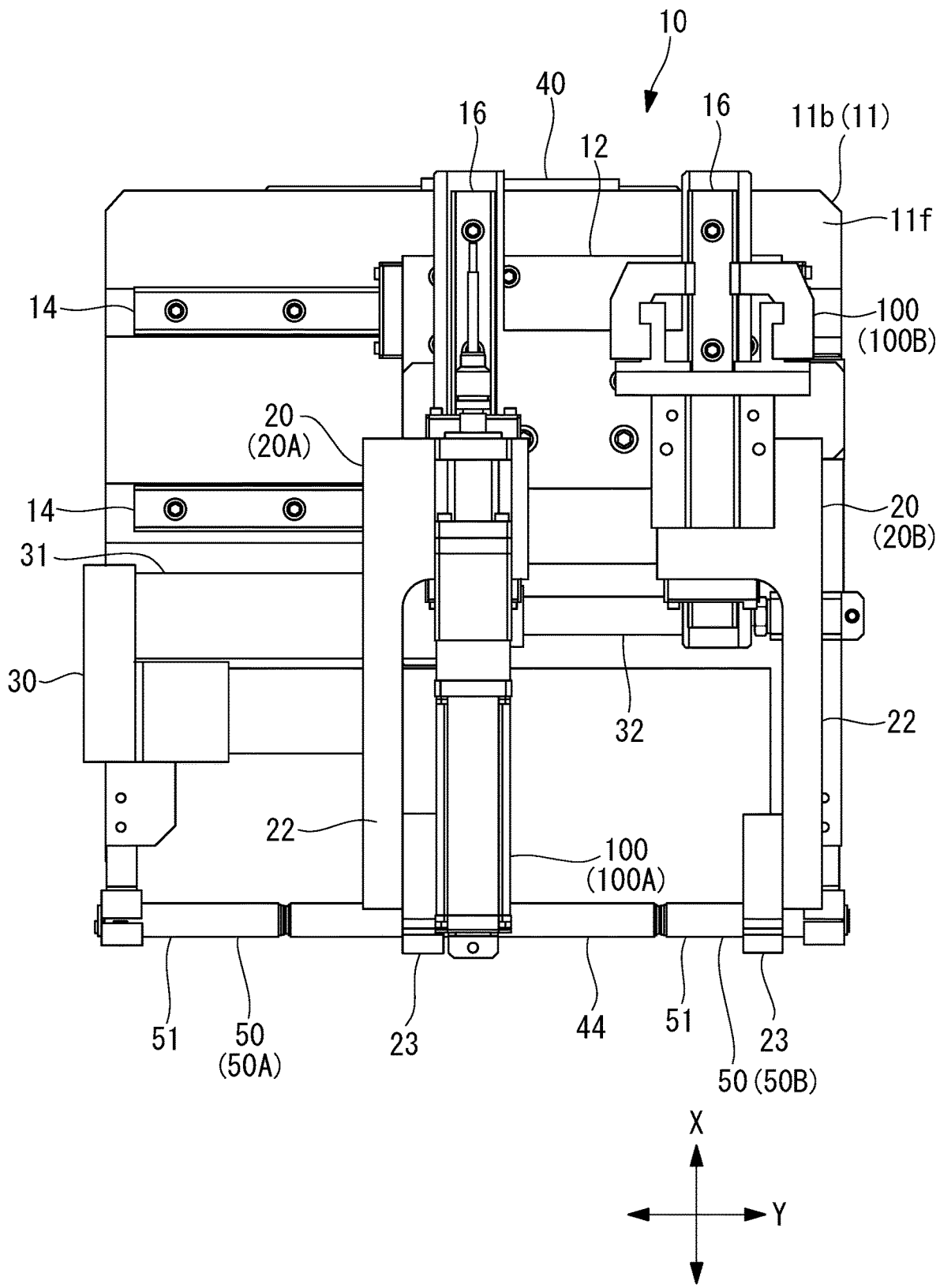
FIG. 6 is a view showing a state in which a first tool-mounting member is held by an X-axis actuator in the tool switching/holding device shown in FIG. 3.
Figure 7:
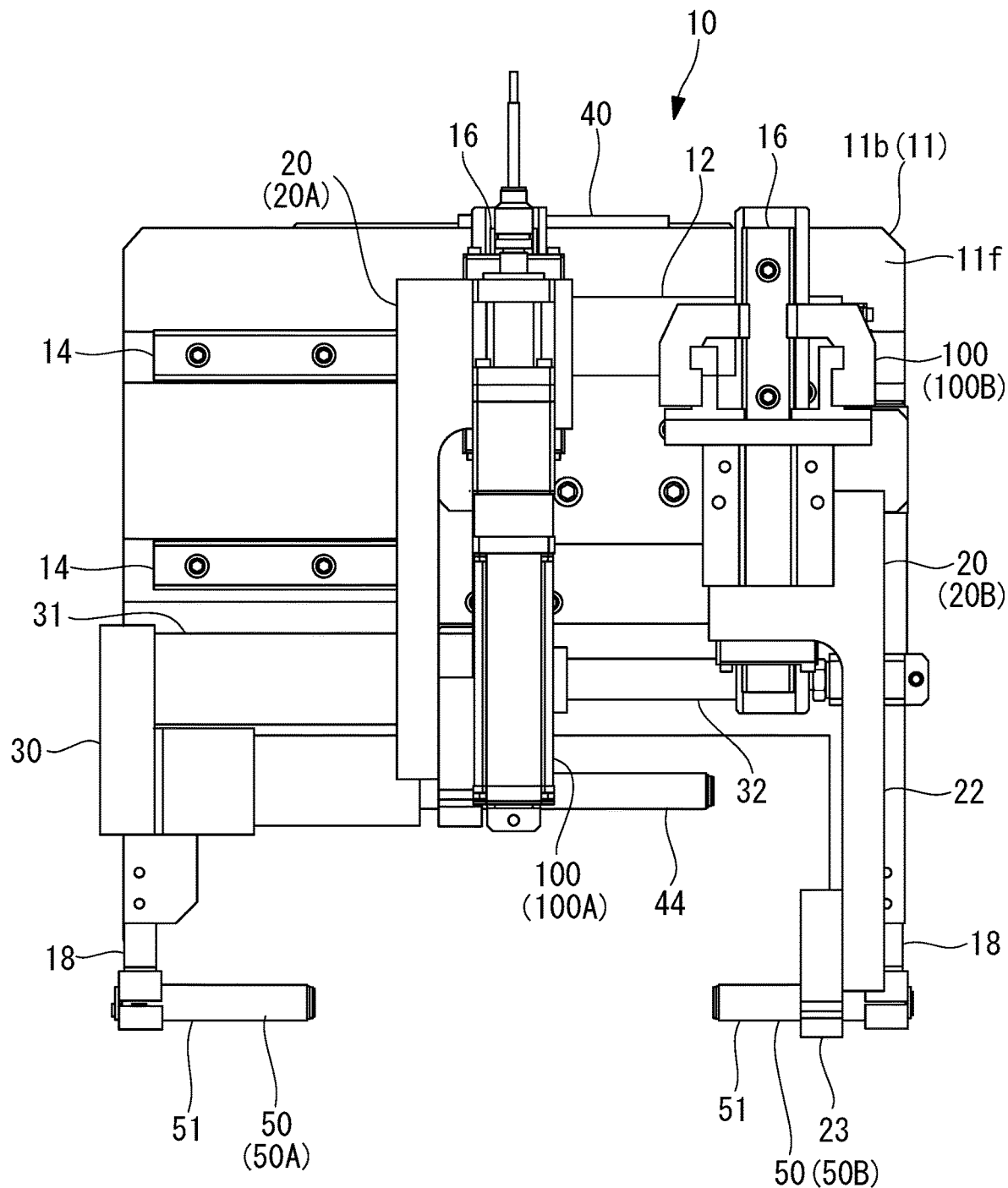
FIG. 7 is a view showing a state in which a tool mounted on the first tool-mounting member held by the X-axis actuator is used, in the tool switching/holding device shown in FIG. 6.

Specifically, as shown in FIG. 6, when the Y-axis slide base 12 is moved in the Y-axis direction, to cause the holding pin 44 to be inserted into the insertion hole 24 in the support arm 23 of the first tool-mounting member 20A, the first tool-mounting member 20A is held by the X-axis actuator 40. At this time, the support arm 23 of the second tool-mounting member 20B is held by the second retreating/locking section 50B, with the locking pin 51 of the second retreating/locking section 50B being inserted into the insertion hole 24 thereof, and retreats from the holding pin 44 of the X-axis actuator 40 in the Y-axis direction. In this state, as shown in FIG. 7, the X-axis actuator 40 is actuated, thereby making it possible to advance or retract the first tool 100A, which is mounted on the first tool-mounting member 20A, in the X-axis direction.

Figure 3:
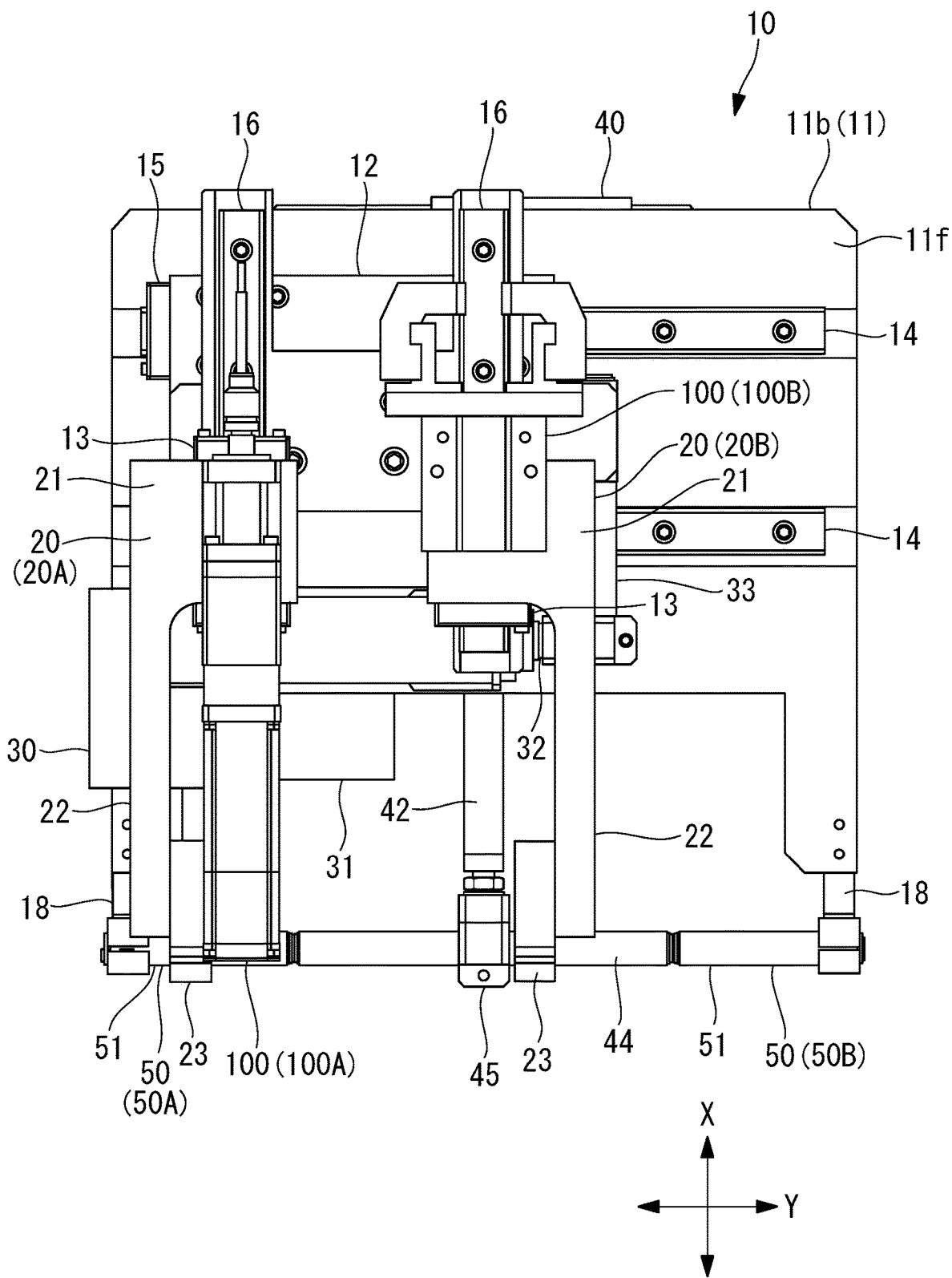
FIG. 3 is a front view of the tool switching/holding device shown in FIG. 1.
Figure 8:
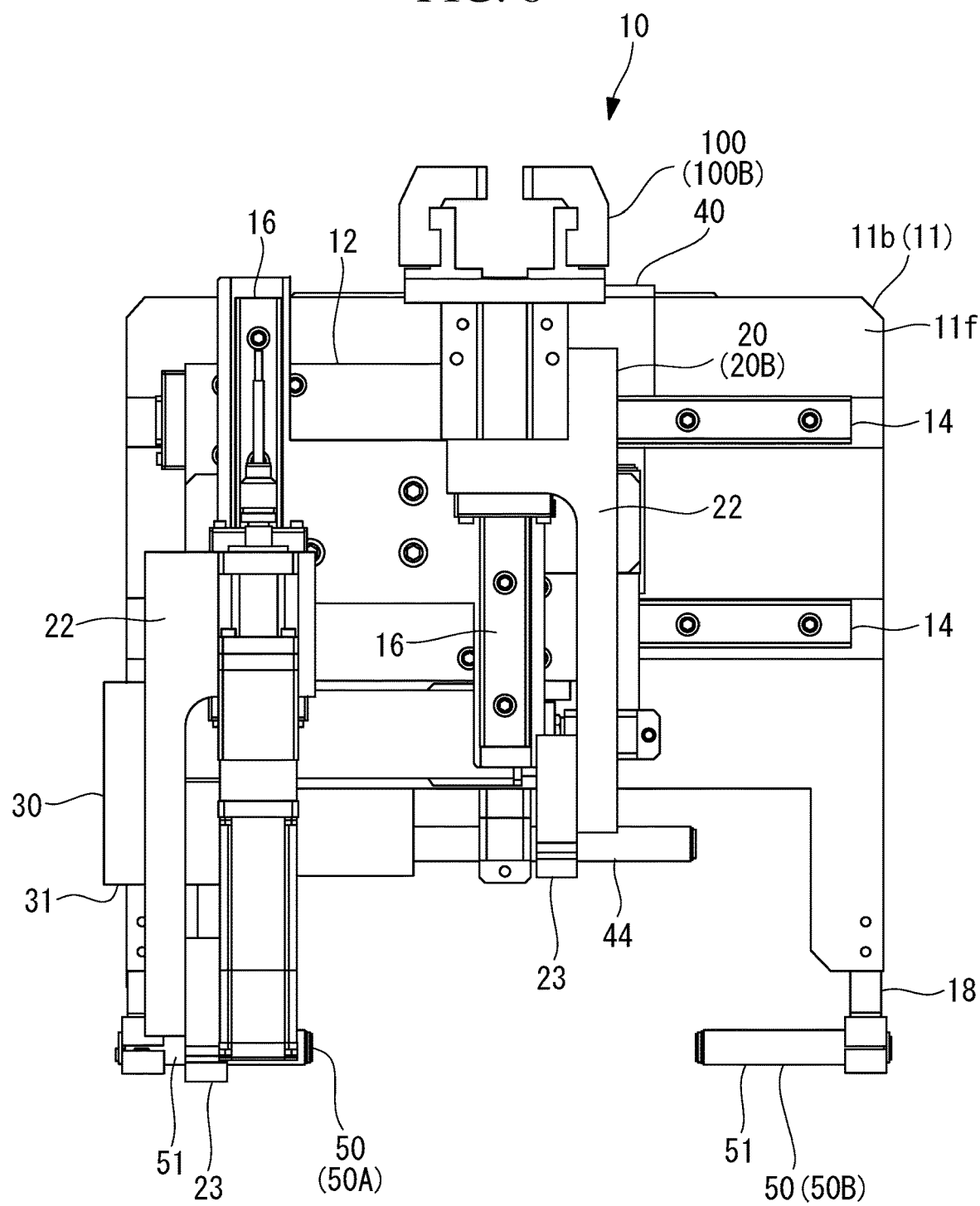
FIG. 8 is a view showing a state in which a tool mounted on a second tool-mounting member held by the X-axis actuator is used, in the tool switching/holding device shown in FIG. 3.

As shown in FIG. 3, when the Y-axis slide base 12 is moved to the other side in the Y-axis direction, to cause the holding pin 44 to be inserted into the insertion hole 24 in the support arm 23 of the second tool-mounting member 20B, the second tool-mounting member 20B is held by the X-axis actuator 40. At this time, the support arm 23 of the first tool-mounting member 20A is held by the first retreating/locking section 50A, with the locking pin 51 of the first retreating/locking section 50A being inserted into the insertion hole 24 thereof, and retreats from the holding pin 44 of the X-axis actuator 40 in the Y-axis direction. In this state, as shown in FIG. 8, the X-axis actuator 40 is actuated, thereby making it possible to advance or retract the second tool 100B, which is mounted on the second tool-mounting member 20B, in the X-axis direction.

The operation of the thus-configured tool switching/holding device 10 and robot system 1 of this embodiment will now be described.

The operations of the tool switching/holding device 10 and the robot system 1 of this embodiment are controlled by the control unit 5 on the basis of a computer program that is set in advance. The operations of the tool switching/holding device 10 and the robot system 1, to be described below, are automatically performed through control performed by the control unit 5, as shown in FIG. 9.

In order to do work using the tools 100 (the first tool 100A and the second tool 100B), which are mounted in the tool switching/holding device 10, in the robot system 1, the arm 3 is actuated to dispose the tool 100 in the vicinity of a work target. In this state, the first tool 100A or the second tool 100B is used to perform predetermined work on the work target.

(Step S101)

Figure 9:
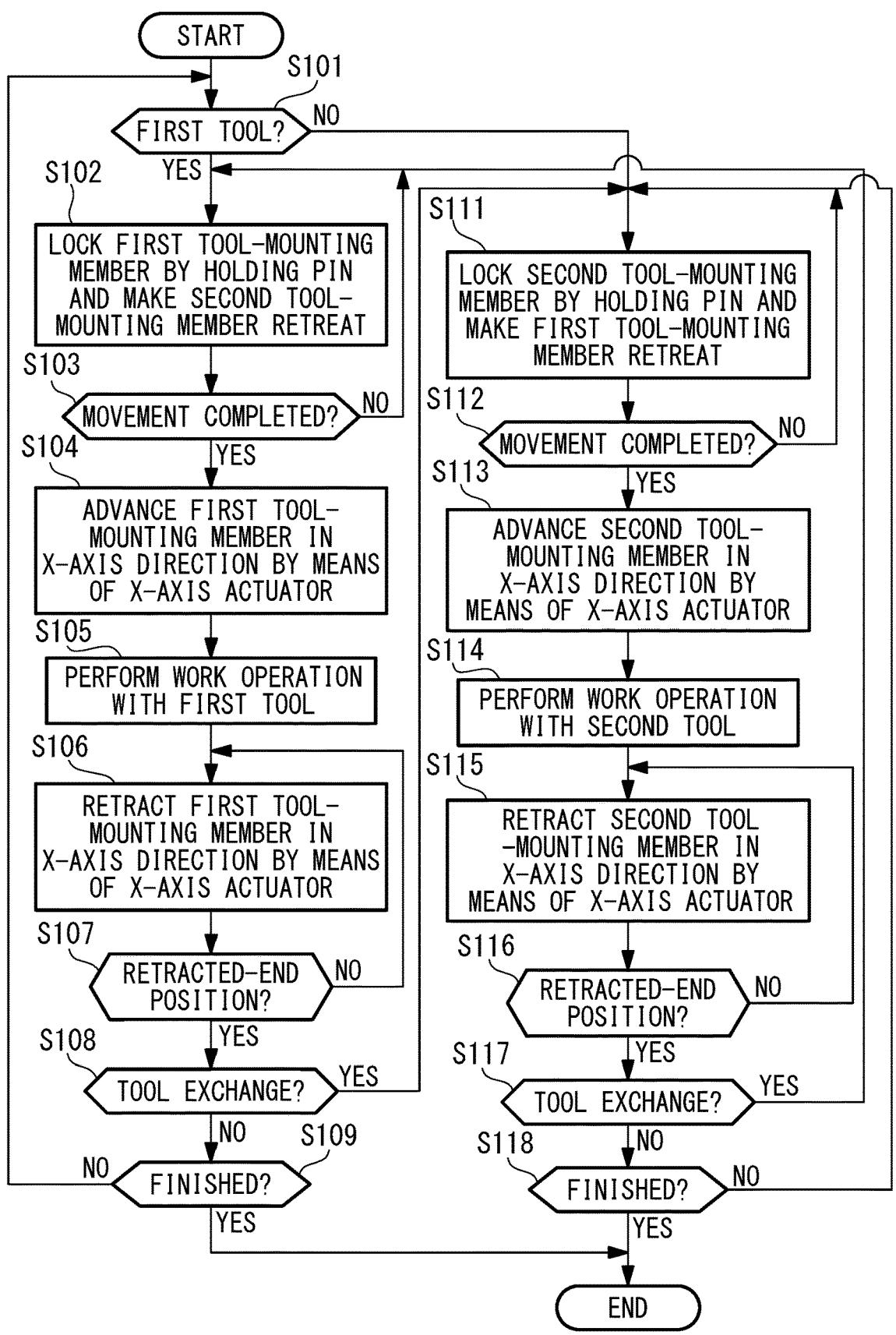
FIG. 9 is a flowchart showing the flow of control performed when the tool switching/holding device is used.

First, as shown in FIG. 9, the control unit 5 determines whether the tool 100 to be used for work is the first tool 100A (Step S101).

In Step S101, if it is determined that the first tool 100A is to be used to do work, the processing flow advances to Step S102. In Step S101, if it is determined that the first tool 100A is not to be used, i.e., the second tool 100B is to be used to do work, the processing flow advances to Step S111, to be described later.

In Step S102, the control unit 5 actuates the Y-axis actuator 30 to move the Y-axis slide base 12 in the Y-axis direction, and to cause the first tool-mounting member 20A, on which the first tool 100A is mounted, to move to the holding pin 44 of the X-axis actuator 40 and to be locked, as shown in FIG. 6 (Step S102). Accordingly, with the movement of the Y-axis slide base 12, the second tool-mounting member 20B, on which the second tool 100B is mounted, is locked by the second retreating/locking section 50B and retreats from the X-axis actuator 40.

At this time, when the Y-axis actuator 30 uses the servomotor for the body 31, the control unit 5 can grasp the position of the Y-axis slide base 12 in the Y-axis direction by monitoring a feedback value sent from the servomotor. In this embodiment, when the rod 32 of the Y-axis actuator 30 is positioned at an advanced end of the stroke on one side in the Y-axis direction, the first tool-mounting member 20A, on which the first tool 100A is mounted, is locked by the holding pin 44 of the X-axis actuator 40, and the second tool-mounting member 20B, on which the second tool 100B is mounted, is locked by the second retreating/locking section 50B. Therefore, by determining whether movement to the advanced end of the stroke in the Y-axis direction has been completed, on the basis of the feedback value sent from the servomotor that constitutes the Y-axis actuator 30 (Step S103), the control unit 5 can confirm whether locking of the first tool-mounting member 20A by the holding pin 44 and a retreating operation of the second tool-mounting member 20B to the second retreating/locking section 50B have been completed.

If locking of the first tool-mounting member 20A by the holding pin 44 and a retreating operation of the second tool-mounting member 20B to the second retreating/locking section 50B have been completed, as shown in FIG. 7, the X-axis actuator 40 is actuated to advance the first tool-mounting member 20A that has been locked by the holding pin 44, along the X-axis direction (Step S104). At this time, because the X-axis actuator 40 is formed of the servomotor, the first tool 100A can be moved to an arbitrary position in the X-axis direction that is set by the computer program.

After the first tool-mounting member 20A is advanced to a predetermined position in the X-axis direction, the control unit 5 actuates the first tool 100A to cause it to perform a predetermined work operation, such as nut fastening work, on the work target (Step S105).

After the predetermined work operation performed by the first tool 100A is completed, the X-axis actuator 40 is actuated to move the first tool-mounting member 20A along the X-axis direction and to retract the holding pin 44 to the retracted-end position P1, where the holding pin 44 is continuous with the locking pins 51 of the first retreating/locking section 50A and the second retreating/locking section 50B (Step S106). The control unit 5 monitors a feedback value sent from the servomotor that constitutes the X-axis actuator 40, and determines whether the first tool-mounting member 20A has been retracted to the retracted-end position P1 (Step S107).

After the predetermined work operation using the first tool 100A is performed in this way, the control unit 5 determines whether there is a need to exchange the tool 100 to be used (Step S108).

If there is no need to exchange the tool 100, the control unit 5 then determines whether a series of work steps for the work target have been completed (Step S109). If the series of work steps have not been completed, the processing flow returns to Step S101, and the above-described processing is repeated. If the series of work steps for the work target have been completed, the control unit 5 ends the series of control processes.

On the other hand, if it is determined in Step S108 that there is a need to change the tool 100 to be used from the first tool 100A to the second tool 100B, or if it is determined in Step S101 that the second tool 100B is to be used to do work, the processing flow advances to Step S111.

In Step S111, as shown in FIG. 3, the control unit 5 actuates the Y-axis actuator 30 to move the Y-axis slide base 12 in the Y-axis direction and to cause the second tool-mounting member 20B, on which the second tool 100B is mounted, to move to the holding pin 44 of the X-axis actuator 40 and to be locked. Accordingly, with the movement of the Y-axis slide base 12, the first tool-mounting member 20A, on which the first tool 100A is mounted, is locked by the first retreating/locking section 50A and retreats from the X-axis actuator 40 in the Y-axis direction.

At this time, by determining whether movement to a retracted end of the stroke in the Y-axis direction has been completed, on the basis of the feedback value sent from the servomotor that constitutes the Y-axis actuator 30 (Step S112), the control unit 5 can confirm whether locking of the second tool-mounting member 20B by the holding pin 44 and a retreating operation of the first tool-mounting member 20A to the first retreating/locking section 50A have been completed.

If locking of the second tool-mounting member 20B by the holding pin 44 and a retreating operation of the first tool-mounting member 20A to the first retreating/locking section 50A have been completed, as shown in FIG. 8, the X-axis actuator 40 is actuated to advance the second tool-mounting member 20B that has been locked by the holding pin 44, along the X-axis direction (Step S113). At this time, because the X-axis actuator 40 is formed of the servomotor, the second tool 100B can be moved to an arbitrary position in the X-axis direction that is set by the computer program.

After the second tool-mounting member 20B is advanced to the predetermined position in the X-axis direction, the control unit 5 actuates the second tool 100B to cause it to perform a predetermined work operation for the work target (Step S114).

After the predetermined work operation performed by the second tool 100B is completed, the X-axis actuator 40 is actuated to move the second tool-mounting member 20B along the X-axis direction and to retract it to the retracted-end position P1, where the holding pin 44 is continuous with the locking pins 51 of the first retreating/locking section 50A and the second retreating/locking section 50B (Step S115). The control unit 5 monitors a feedback value sent from the servomotor that constitutes the X-axis actuator 40, and determines whether the second tool-mounting member 20B has been retracted to the retracted-end position P1 (Step S116).

After the predetermined work operation using the second tool 100B is performed in this way, the control unit 5 determines whether there is a need to exchange the tool 100 to be used (Step S117).

If there is a need to exchange the tool 100, the above-described processing from Step S102 is performed. If there is no need to exchange the tool 100, the control unit 5 then determines whether a series of work steps for the work target have been completed (Step S118). If the series of work steps for the work target have not been completed, the processing flow returns to Step S111, and the above-described processing is repeated. If the series of work steps for the work target have been completed, the control unit 5 ends the series of control processes.

In this way, according to the tool switching/holding device 10 and the robot system 1 of this embodiment, the X-axis actuator 40 selectively holds one of the tool mounting members 20 (the first tool-mounting member 20A and the second tool-mounting member 20B), which are provided on the respective X-axis slide bases 13. The tool mounting member 20 that is held by the X-axis actuator 40 is driven by the X-axis actuator 40 so as to advance or retract in the X-axis direction, and predetermined work can be performed by means of the tool 100 (the first tool 100A or the second tool 100B) that is mounted on the held tool mounting member 20.

Of the plurality of tool mounting members 20, the tool mounting member 20 other than the tool mounting member 20 that is held by the X-axis actuator 40 is made to retreat, by the retreating/locking section 50, to a position away from the X-axis actuator 40 in the Y-axis direction and is locked thereto. Accordingly, the other tool mounting member 20 does not interfere with the operation of the tool mounting member 20 that is held by the X-axis actuator 40. In this way, one of the plurality of tool mounting members 20 is held by the X-axis actuator 40, and the other tool mounting member 20 is made to retreat by the retreating/locking section 50, thereby making it possible to easily perform exchange of the first tool 100A and the second tool 100B without moving the arm 3 of the robot 2.

In order to make the other tool mounting member 20 retreat, that tool mounting member 20 needs to be moved in the Y-axis direction by the Y-axis actuator 30. Therefore, besides the Y-axis actuator 30 and the X-axis actuator 40, it is not necessary to provide a separate actuator or the like for exchanging the tools 100.

Therefore, it is possible to efficiently exchange the first tool 100A and the second tool 100B even with a simple structure.

The holding pin 44 is inserted into the insertion hole 24 of the first tool-mounting member 20A or the second tool-mounting member 20B, thus making it possible to hold, with the X-axis actuator 40, the corresponding one of the first tool-mounting member 20A and the second tool-mounting member 20B. Each of the retreating/locking sections 50 is provided with the locking pin 51, which extends in the Y-axis direction and which can be inserted into the insertion hole 24 of the tool mounting member 20. By doing so, in order to make the tool mounting member 20 retreat from the X-axis actuator 40, the locking pin 51 needs to be inserted into the insertion hole 24 thereof.

When the X-axis actuator 40 positions the holding pin 44 at the retracted-end position P1, which is a prescribed position in the X-axis direction, the locking pins 51 are disposed, coaxially with the holding pin 44, at both sides of the holding pin 44. By doing so, the Y-axis slide base 12 is only slid in the Y-axis direction by the Y-axis actuator 30, thereby making it possible to easily cause the tool mounting member 20 to be held by the holding pin 44 or the locking pin 51.

The servomotor is used for the Y-axis actuator 30. Here, when the Y-axis actuator 30 is formed of a pneumatic cylinder or a hydraulic cylinder, for example, it is impossible to stop the first tool-mounting member 20A and the second tool-mounting member 20B at positions in the middle of the movement stroke of the pneumatic cylinder or the hydraulic cylinder. In contrast to this, when the Y-axis actuator 30 is formed of a servomotor, it is possible to stop the first tool-mounting member 20A and the second tool-mounting member 20B at arbitrary positions in the middle of the movement stroke thereof.

The X-axis slide bases 13 and the tool mounting members 20 are provided in two pairs, and the two retreating/locking sections 50 are provided, so that, when the control unit 5 causes the X-axis actuator 40 to hold one of the tool mounting members 20 in the two pairs, the other tool mounting member 20 is locked by one of the two retreating/locking sections 50 corresponding thereto, and, when the other tool mounting member 20 in the two pairs is held by the X-axis actuator 40, said one tool mounting member 20 is locked by the other one of the two retreating/locking sections 50 corresponding thereto.

By doing so, predetermined work can be performed while the tool mounting members 20 in the two pairs are held alternately by the retreating/locking section 50 and the X-axis actuator 40.

Second Embodiment

Next, a tool switching/holding device 10B and a robot system 1 according to a second embodiment of the present invention will now be described. In the following description, identical reference signs are assigned to structures common to those in the above-described first embodiment, and a description thereof will be omitted.

Figure 10:
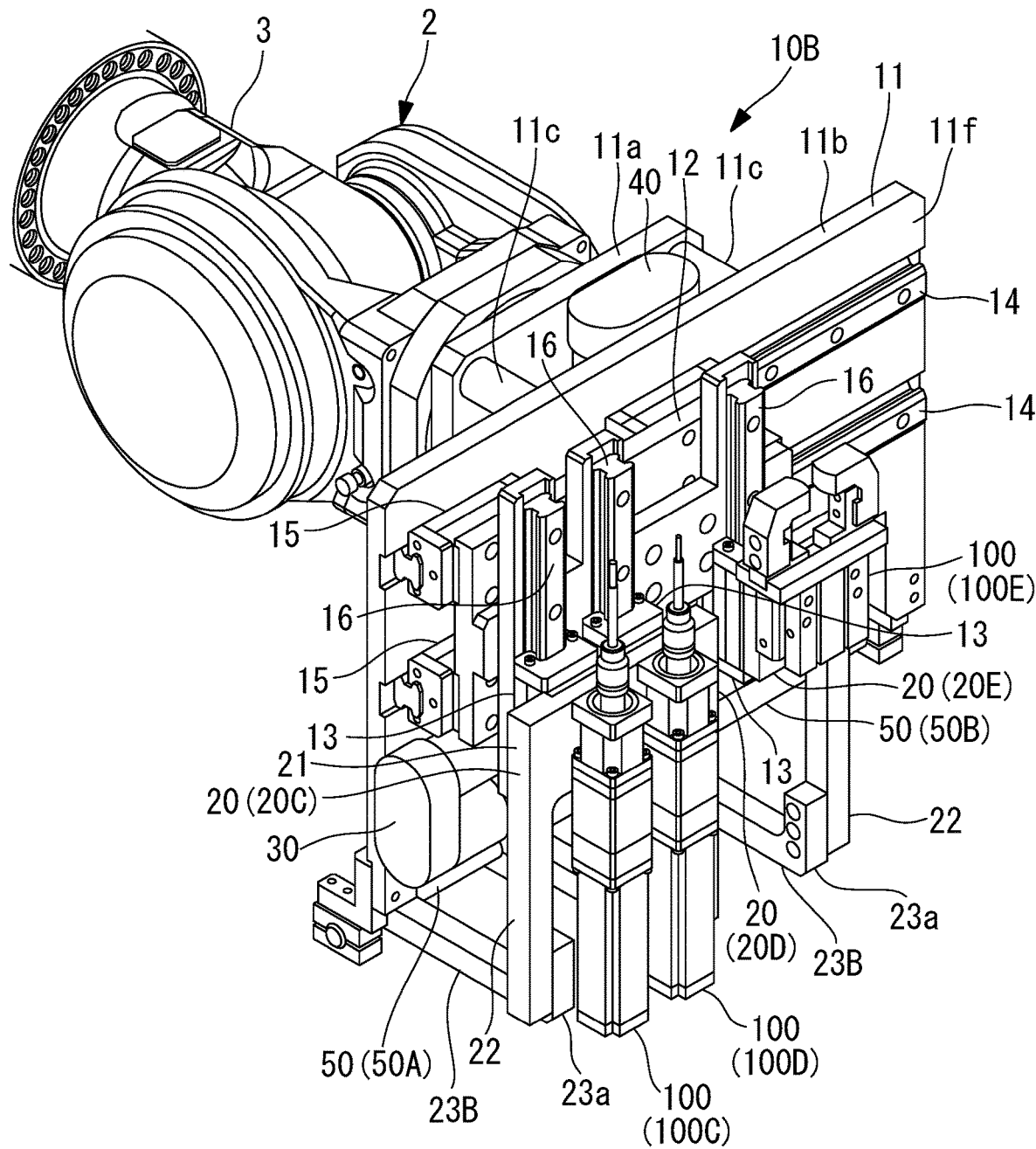
FIG. 10 is a perspective view showing a tool switching/holding device according to a second embodiment of the present invention.
Figure 10:
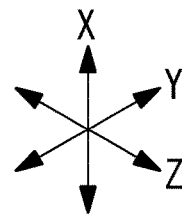
Figure 11:
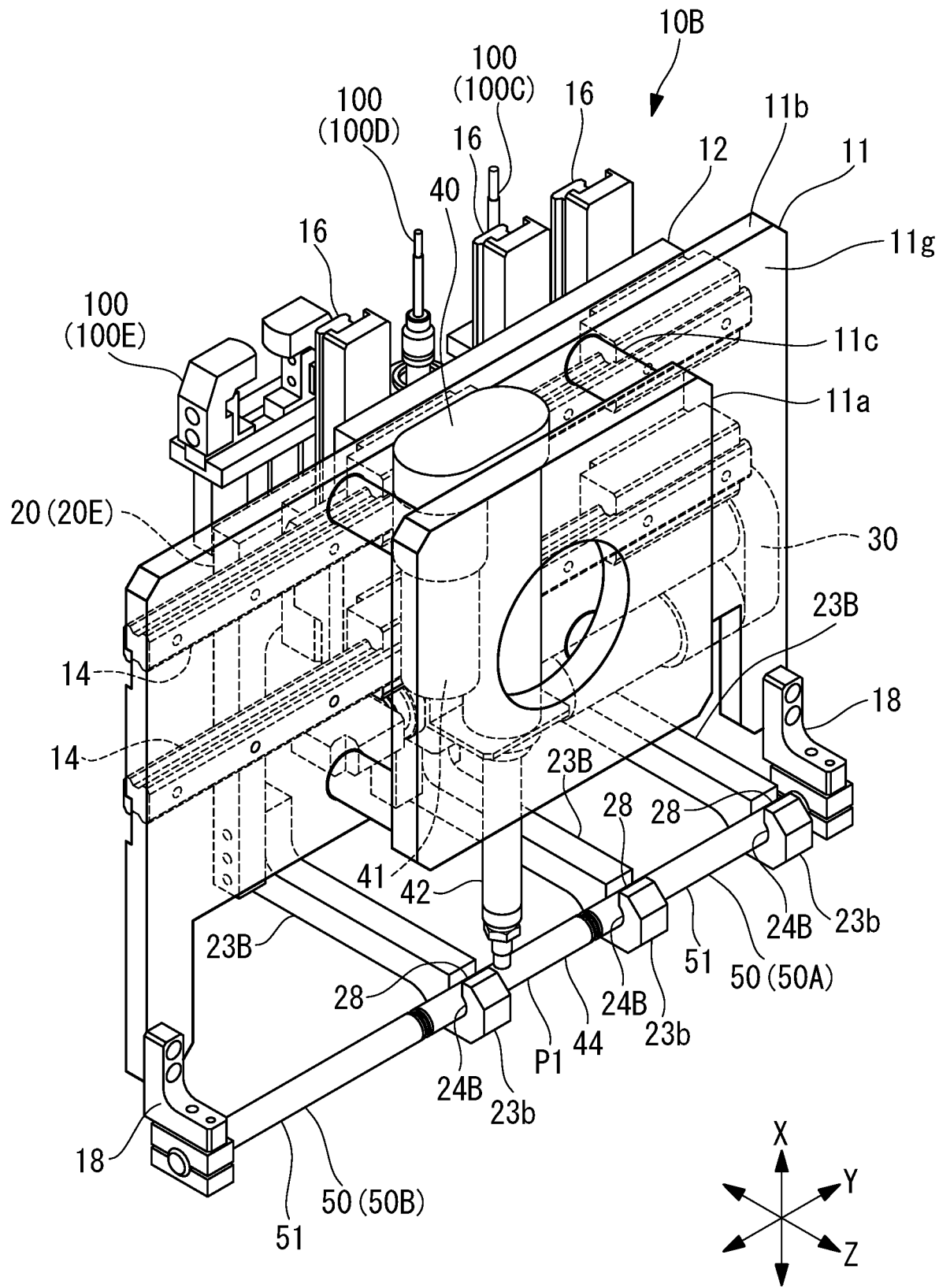
FIG. 11 is a perspective view of the tool switching/holding device shown in FIG. 10, as viewed obliquely from the rear.

As shown in FIGS. 10 and 11, the robot system 1 of this embodiment is provided with the tool switching/holding device 10B, which is mounted on an arm 3 of a robot 2.

The tool switching/holding device 10B is provided with a base 11, a Y-axis slide base 12, X-axis slide bases 13, tool mounting members 20, a Y-axis actuator 30, an X-axis actuator 40, and retreating/locking sections 50.

The Y-axis slide base 12 is provided with X-axis guide rails 16 that run along the front surface 11*f* of the second base member 11*b* and that extend in the X-axis direction perpendicular to the Y-axis. In this embodiment, the three X-axis guide rails 16 are provided with gaps therebetween in the Y-axis direction. The X-axis slide bases 13 are provided on the three X-axis guide rails 16, respectively, so as to be slidingly movable along the X-axis guide rails 16.

As the tool mounting members 20, the three X-axis slide bases 13 are respectively provided with a first tool-mounting member 20C, a second tool-mounting member 20D, and a third tool-mounting member 20E. The tool mounting members 20 are each provided with a mounting base section 21, an arm section 22, and a support arm 23B.

In this embodiment, as a first tool 100C and a second tool 100D, nut runners for fastening bolts and nuts are mounted on the mounting base sections 21 of the first tool-mounting member 20C and the second tool-mounting member 20D. As a third tool 100E, a hand for gripping parts etc. is mounted on the mounting base section 21 of the third tool-mounting member 20E.

Figure 12:
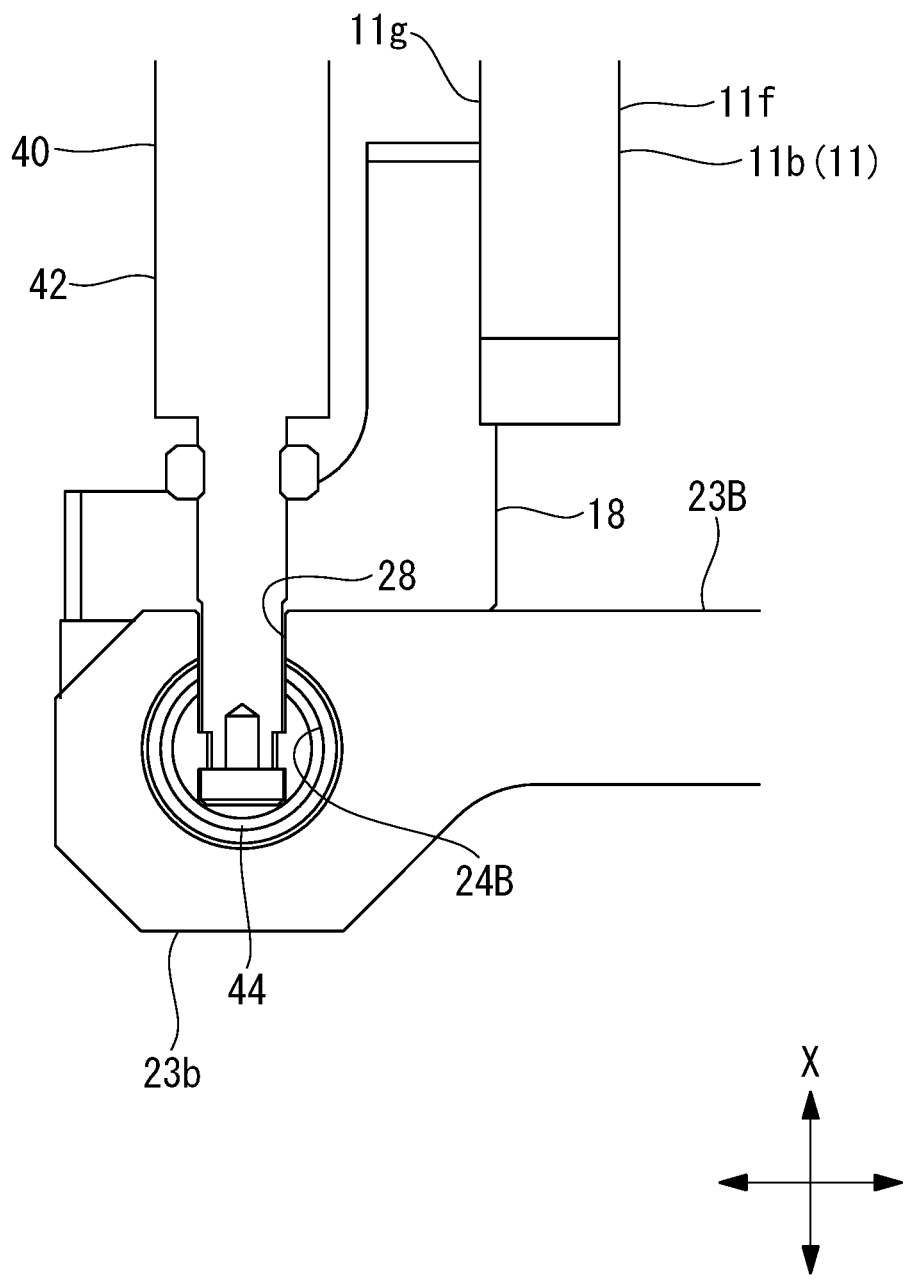
FIG. 12 is a side view showing a support arm of the tool switching/holding device shown in FIG. 10.

The base sections 23*a* of the support arms 23B are coupled to the lower ends of the arm sections 22. As shown in FIGS. 11 and 12, the support arms 23B are provided so as to extend toward the second base member 11*b* in the Z-axis direction perpendicular to the X-axis direction and the Y-axis direction and such that the distal end sections 23*b* thereof protrude so as to be closer to the first base member 11*a* than the second base member 11*b* is. Insertion holes 24B that penetrate the support arms 23B in the Y-axis direction are formed in the distal end sections 23*b* of the support arms 23B.

Notch portions 28 that are obtained by cutting out partial regions of the insertion holes 24B in the circumferential direction are formed in the distal end sections 23*b* of the support arms 23B. The notch portions 28 each have an opening width that is slightly larger than the thickness dimension of the rod 42 in the Z-axis direction and that is smaller than the outer diameter of the holding pin 44 and are provided such that, when the X-axis actuator 40 is moved in the Y-axis direction in accordance with movement of the Y-axis slide base 12 in the Y-axis direction, the rod 42 of the X-axis actuator 40 passes through the notch portions 28, thereby avoiding interference between the rod 42 and the support arms 23B.

The X-axis actuator 40 is provided on the rear surface 11*g* of the second base member 11*b* that faces the opposite side from the front surface 11*f*. The X-axis actuator 40 is provided with, at the distal end portion of the rod 42, a holding pin 44 that selectively holds one of the plurality of tool mounting members 20 (the first tool-mounting member 20C, the second tool-mounting member 20D, and the third tool-mounting member 20E), which are provided on the plurality of X-axis slide bases 13. The holding pin 44 has an outer diameter slightly smaller than the inner diameters of the insertion holes 24B, which are provided in the support arms 23B, and can be inserted into the insertion holes 24B.

The X-axis actuator 40 actuates the body 41 to advance or retract the rod 42 in the X-axis direction, thus moving the holding pin 44, which is provided at the distal end portion of the rod 42, along the X-axis direction.

As shown in FIGS. 10 and 11, the retreating/locking sections 50 include a first retreating/locking section 50A and a second retreating/locking section 50B. The locking pin 51 of the first retreating/locking section 50A and the locking pin 51 of the second retreating/locking section 50B are disposed on both sides of the holding pin 44 of the X-axis actuator 40 in the Y-axis direction. The locking pins 51 each have an outer diameter slightly smaller than the inner diameters of the insertion holes 24B, which are provided in the support arms 23B, and can be inserted into the insertion holes 24B.

The locking pin 51 of the first retreating/locking section 50A and the locking pin 51 of the second retreating/locking section 50B are provided so as to be coaxially continuous with the holding pin 44 when the body 41 of the X-axis actuator 40 is actuated to move the rod 42 and to position the holding pin 44 at the prescribed position (retracted-end position P1) in the X-axis direction.

In the tool switching/holding device 10B, through control of the control unit 5, the Y-axis actuator 30 moves the Y-axis slide base 12 in the Y-axis direction, thus causing the X-axis actuator 40 to selectively hold one of the plurality of tool-mounting members, i.e., the first tool-mounting member 20C, the second tool-mounting member 20D, and the third tool-mounting member 20E.

Figure 13:
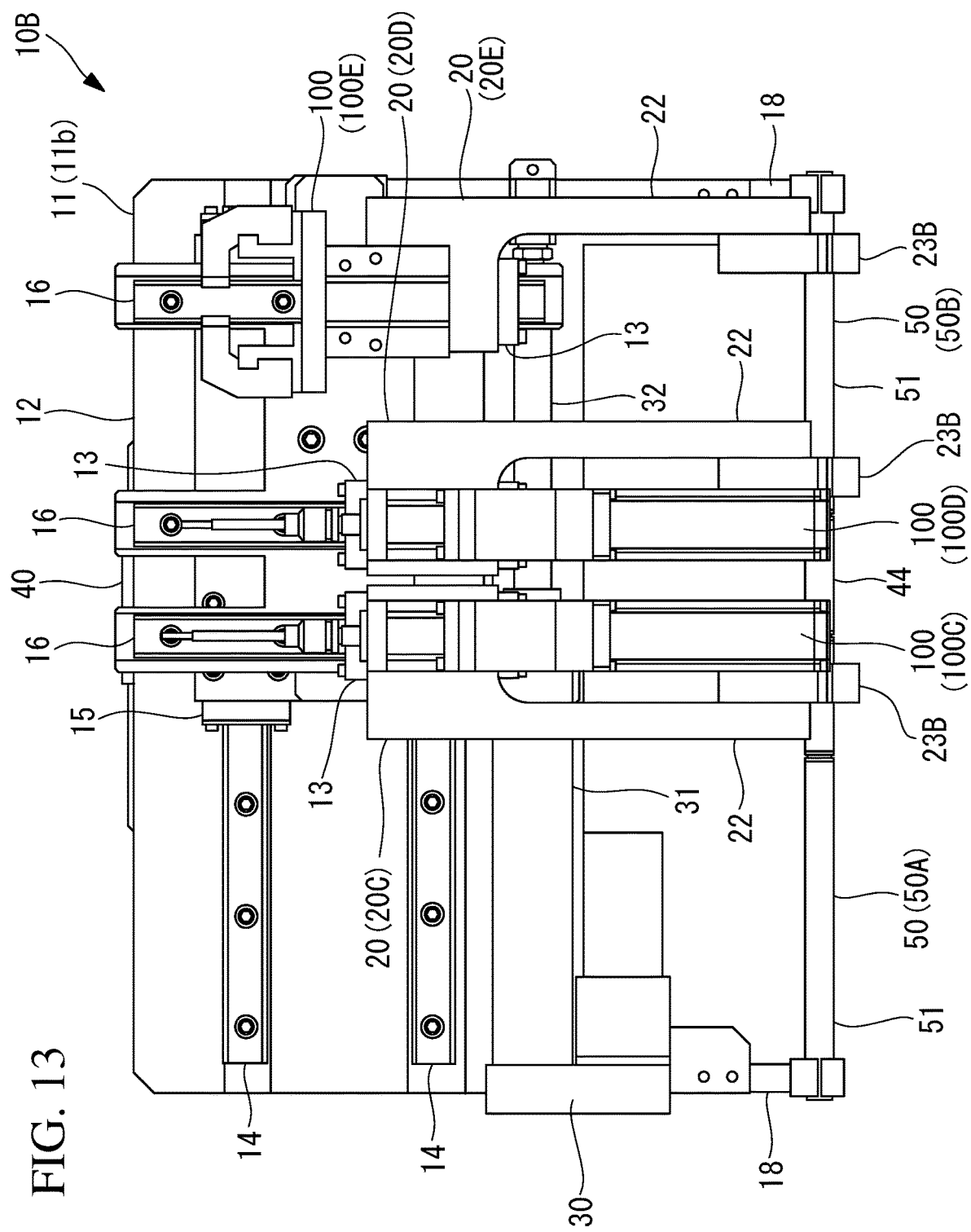
FIG. 13 is a view showing a state in which a first tool-mounting member is held by the X-axis actuator, in the tool switching/holding device shown in FIG. 10.
Figure 14:
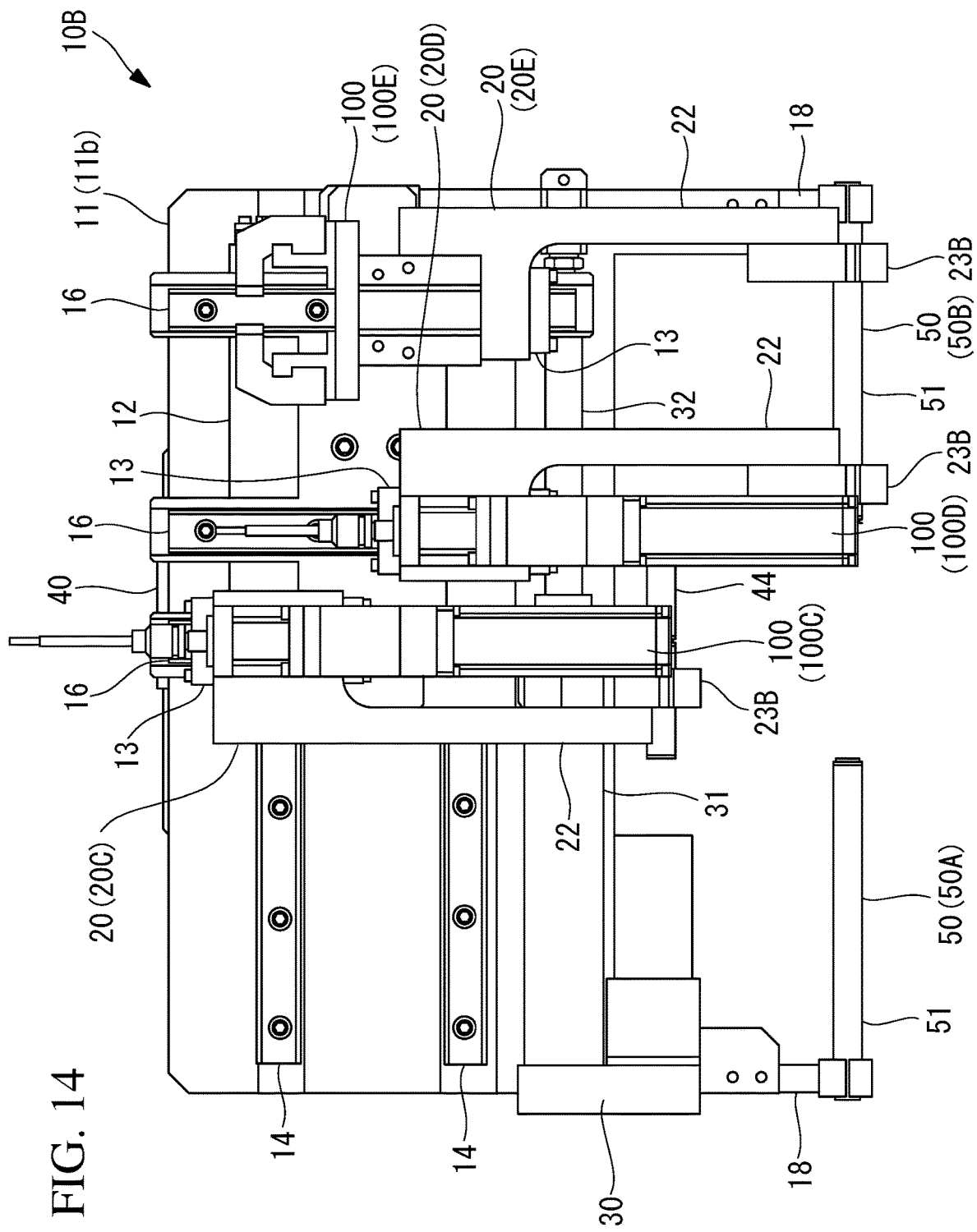
FIG. 14 is a view showing a state in which a tool mounted on the first tool-mounting member held by the X-axis actuator is used, in the tool switching/holding device shown in FIG. 13.

Specifically, as shown in FIG. 13, when the Y-axis slide base 12 is moved to one side in the Y-axis direction, to cause the holding pin 44 to be inserted into the insertion hole 24B in the support arm 23B of the first tool-mounting member 20C, the first tool-mounting member 20C is held by the X-axis actuator 40. At this time, the support arms 23B of the second tool-mounting member 20D and the third tool-mounting member 20E are held by the second retreating/locking section 50B, with the locking pin 51 of the second retreating/locking section 50B being inserted into the insertion holes 24B thereof. In this state, as shown in FIG. 14, the X-axis actuator 40 is actuated, thereby making it possible to advance or retract the first tool 100C, which is mounted on the first tool-mounting member 20C, in the X-axis direction.

Figure 15:
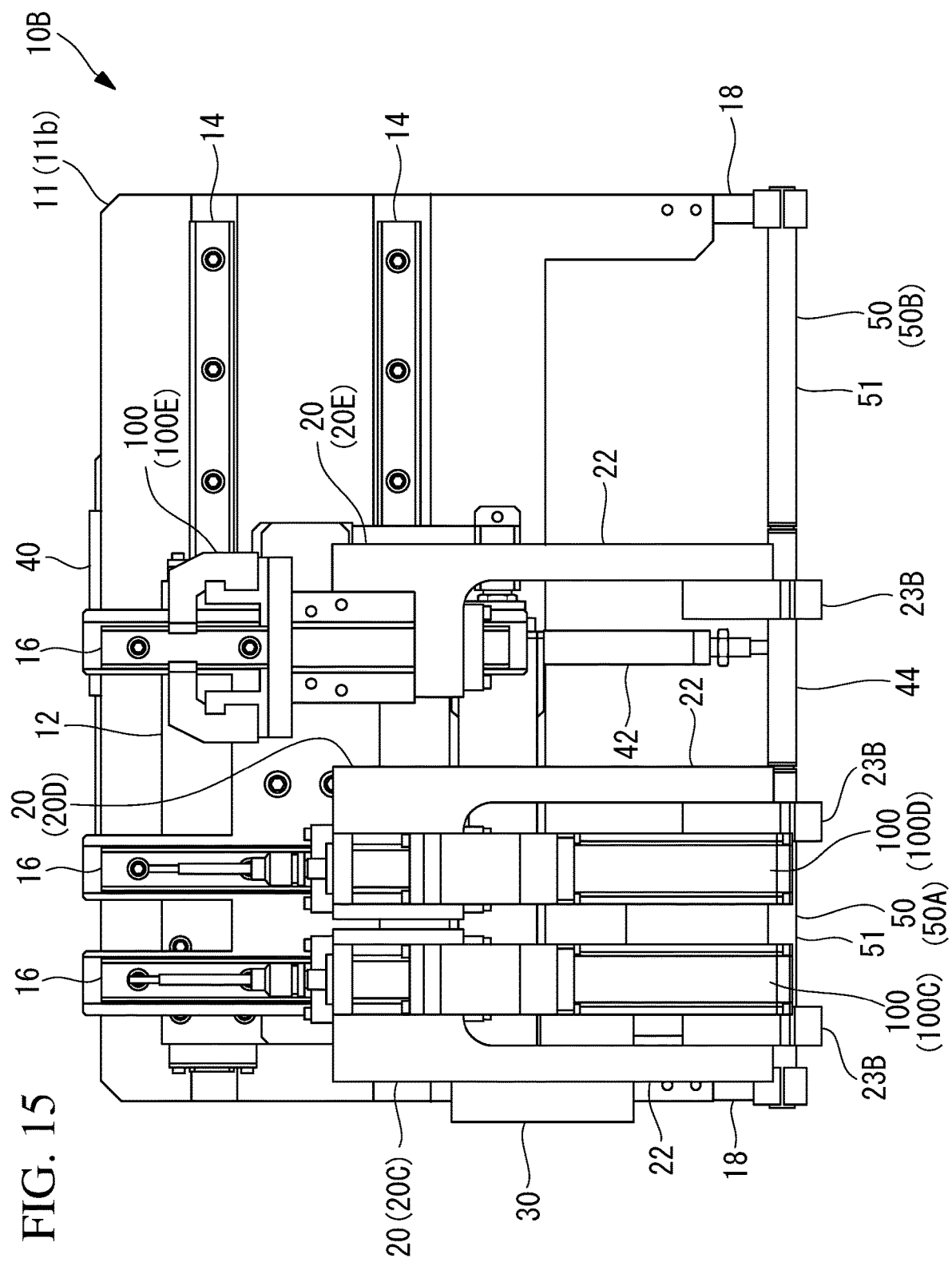
FIG. 15 is a view showing a state in which a third tool mounting member is held by the X-axis actuator, in the tool switching/holding device shown in FIG. 10.
Figure 16:
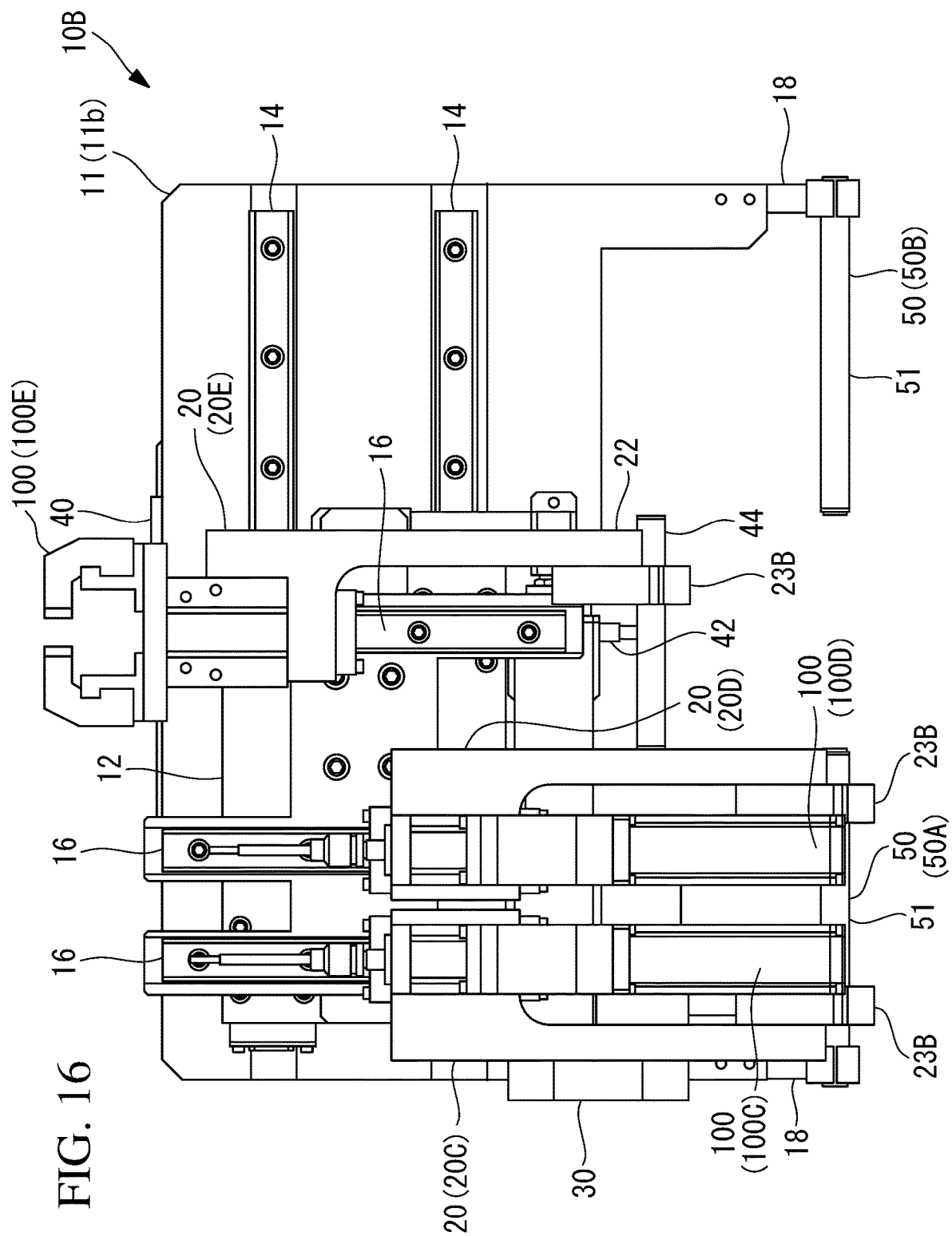
FIG. 16 is a view showing a state in which a tool mounted on the third tool mounting member held by the X-axis actuator is used, in the tool switching/holding device shown in FIG. 15.

As shown in FIG. 15, when the Y-axis slide base 12 is moved to the other side in the Y-axis direction, to cause the holding pin 44 to be inserted into the insertion hole 24B in the support arm 23B of the third tool-mounting member 20E, the third tool-mounting member 20E is held by the X-axis actuator 40. At this time, the support arms 23B of the second tool-mounting member 20D and the first tool-mounting member 20C are held by the first retreating/locking section 50A, with the locking pin 51 of the first retreating/locking section 50A being inserted into the insertion holes 24B thereof. In this state, as shown in FIG. 16, the X-axis actuator 40 is actuated, thereby making it possible to advance or retract the third tool 100E, which is mounted on the third tool-mounting member 20E, in the X-axis direction.

Figure 17:
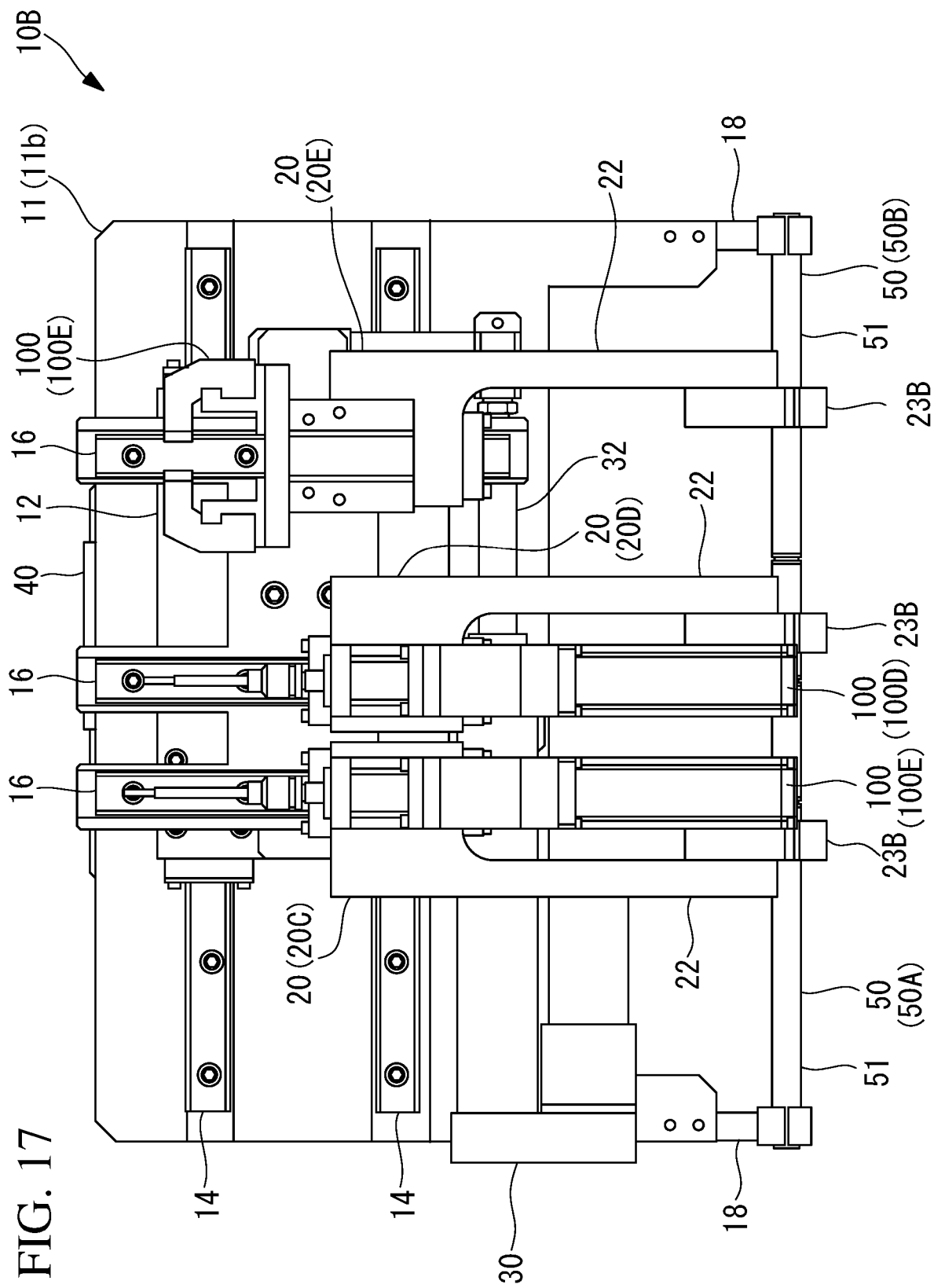
FIG. 17 is a view showing a state in which a second tool-mounting member is held by the X-axis actuator, in the tool switching/holding device shown in FIG. 10.
Figure 18:
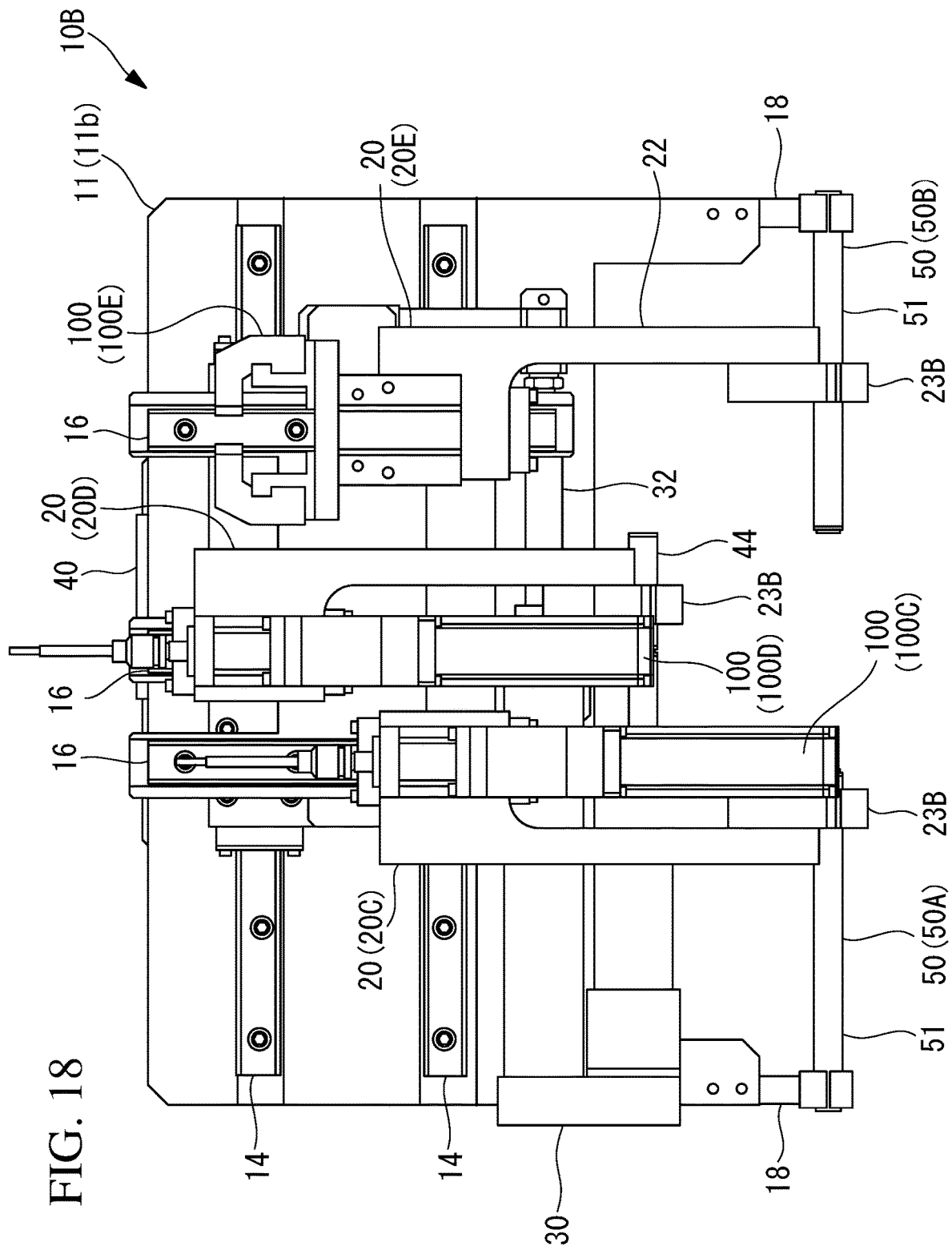
FIG. 18 is a view showing a state in which a tool mounted on the second tool-mounting member held by the X-axis actuator is used, in the tool switching/holding device shown in FIG. 17.

As shown in FIG. 17, when the Y-axis slide base 12 is moved to an intermediate position between the position shown in FIG. 13 and the position shown in FIG. 15, to cause the holding pin 44 to be inserted into the insertion hole 24B in the support arm 23B of the second tool-mounting member 20D, the second tool-mounting member 20D is held by the X-axis actuator 40. At this time, the support arm 23B of the first tool-mounting member 20C is held by the first retreating/locking section 50A, with the locking pin 51 of the first retreating/locking section 50A being inserted into the insertion hole 24B thereof. The support arm 23B of the third tool-mounting member 20E is held by the second retreating/locking section 50B, with the locking pin 51 of the second retreating/locking section 50B being inserted into the insertion hole 24B thereof. In this state, as shown in FIG. 18, the X-axis actuator 40 is actuated, thereby making it possible to advance or retract the second tool 100D, which is mounted on the second tool-mounting member 20D, in the X-axis direction.

In this way, according to the tool switching/holding device 10B and the robot system 1 of this embodiment, the X-axis slide bases 13 and the tool mounting members 20 are provided in three pairs, and the two retreating/locking sections 50 are provided. When the control unit 5 causes the X-axis actuator 40 to hold the first tool-mounting member 20C, among the tool mounting members 20 in the three pairs, the second tool-mounting member 20D and the third tool-mounting member 20E are locked by the second retreating/locking section 50B. When the X-axis actuator 40 is caused to hold the second tool-mounting member 20D, the first tool-mounting member 20C is locked by the first retreating/locking section 50A, and the third tool-mounting member 20E is locked by the second retreating/locking section 50B. When the third tool-mounting member 20E is held by the X-axis actuator 40, the first tool-mounting member 20C and the second tool-mounting member 20D are locked by the first retreating/locking section 50A.

By doing so, even in a case in which the tool mounting members 20 are provided in three pairs, while one of the tool mounting members 20 in the three pairs is selectively held by the X-axis actuator 40, the other remaining tool mounting members 20 can be locked by the two retreating/locking sections 50. Accordingly, it is possible to perform predetermined work while exchanging the three tools 100 (the first tool 100C, the second tool 100D, and the third tool 100E), which are mounted on the tool mounting members 20 in the three pairs.

Among the plurality of tool mounting members 20, the tool mounting members 20 other than the tool mounting member 20 that is held by the X-axis actuator 40 are made to retreat, by the retreating/locking section(s) 50, to positions away from the X-axis actuator 40 in the Y-axis direction and are locked thereto. Accordingly, the other tool mounting members 20 do not interfere with the operation of the tool mounting member 20 that is held by the X-axis actuator 40. In this way, one of the plurality of tool mounting members 20 is held by the X-axis actuator 40, and the other tool mounting members 20 are made to retreat by the retreating/locking section(s) 50, thereby making it possible to easily exchange the first tool 100C, the second tool 100D, and the third tool 100E.

In order to make the other tool mounting members 20 retreat, the tool mounting members 20 need to be moved in the Y-axis direction by the Y-axis actuator 30. Therefore, besides the X-axis actuator 30 and the X-axis actuator 40, it is not necessary to provide a separate actuator or the like for exchanging the tools 100.

Therefore, it is possible to efficiently exchange the first tool 100C, the second tool 100D, and the third tool 100E even with a simple structure.

The support arms 23B of the tool mounting members 20 have, at the outer peripheries of the insertion holes 24B, the notch portions 28, with which interference with the X-axis actuator 40 is avoided. By doing so, the rod 42 of the X-axis actuator 40 is made to pass through the notch portions 28, thereby making it possible to move the tool mounting members 20 to both sides of the X-axis actuator 40.

In the above-described embodiments, although the locking pins 51 are provided so as to be positioned at positions on both sides of the holding pin 44, the positions thereof are not limited thereto. The locking pins 51 may be provided at positions, other than the retracted-end position P1, in the X-axis direction. For example, the locking pins 51 may be provided at positions that are different from the holding pin 44 in the Z-axis direction. In that case, the arm 3 of the robot 2 is actuated, thereby causing the tool mounting member 20 of the tool 100 that is not held by the holding pin 44 of the X-axis actuator 40 to be locked by the corresponding locking pin 51.

As a result, the following aspect is derived from the above described embodiment.

According to one aspect, the present invention provides a tool switching/holding device including: a base; a first member that is provided so as to be movable along a first-axis direction with respect to the base; a first actuator that moves the first member in the first-axis direction with respect to the base; a plurality of second members that are provided on the first member and that are each supported so as to be movable in a second-axis direction perpendicular to the first-axis direction; tool mounting members that are provided on the respective second members and on each of which a tool is mounted; a second actuator that selectively holds one of the tool mounting members, which are provided on the plurality of second members, respectively, and that moves the held tool mounting member in the second-axis direction; and a plurality of retreating/locking sections that cause, of the plurality of tool mounting members, the tool mounting member other than the tool mounting member that is selectively held by the second actuator, to retreat to a position away from the second actuator in the first-axis direction or the second-axis direction and that each lock the retreating tool mounting member.

According to this aspect, the tools held by the tool mounting members can be moved in the first-axis direction when the first member is moved with respect to the base by the first actuator. The tools can be moved in the second-axis direction with respect to the first member when the second members are moved by the second actuator. In this way, the tools can be moved in two directions, i.e., the first-axis direction and the second-axis direction.

Here, the second actuator selectively holds one of the plurality of tool mounting members, which are provided on the plurality of second members. The tool mounting member that is held by the second actuator is driven by the second actuator so as to advance or retract in the second-axis direction, and predetermined work can be performed by means of the tool that is mounted on this tool mounting member.

Of the plurality of tool mounting members, the tool mounting member other than the tool mounting member that is held by the second actuator is made to retreat, by the corresponding retreating/locking section, to a position away from the second actuator in the first-axis direction or the second-axis direction and is locked thereto. Accordingly, the other tool mounting member does not interfere with the operation of the tool mounting member that is held by the second actuator. In this way, one of the plurality of tool mounting members is held by the second actuator, and the other tool mounting member is made to retreat by the corresponding retreating/locking section, thereby making it possible to easily perform tool exchange.

In order to make the other tool mounting member retreat, the other tool mounting member needs to be moved in the first-axis direction or the second-axis direction by the first actuator or the second actuator. Therefore, besides the first actuator and the second actuator, which move the tools in the first-axis direction and the second-axis direction, it is not necessary to provide a separate actuator or the like for tool exchange.

In the above-described aspect, the tool mounting members may each have an insertion hole penetrating therethrough in the first-axis direction; the second actuator may be provided with a holding pin that extends in the first-axis direction and that can be inserted into the insertion holes of the tool mounting members; and the retreating/locking sections may be each provided with a locking pin that extends in the first-axis direction and that can be inserted into the insertion holes of the tool mounting members.

By doing so, the holding pin is inserted into the insertion hole in the tool mounting member, thereby making it possible to hold, with the second actuator, the tool mounting member. In order to make the other holding pin retreat from the second actuator, the locking pin needs to be inserted into the insertion hole that is formed in the other tool mounting member. Here, because the insertion holes, the holding pin, and the locking pins all extend in the first-axis direction, when the tool mounting members are moved in the second-axis direction by the second actuator in a state in which the insertion holes of the tool mounting members are opposed to the holding pin or the locking pins in the first-axis direction, it is possible to easily cause the tool mounting member to be held by the holding pin or the locking pin.

In the above-described aspect, the locking pins may be provided so as to be positioned coaxially with the holding pin, on both sides of the holding pin when the second actuator positions the holding pin at a prescribed position in the second-axis direction.

By doing so, the tool that is to be used can be supported by the second actuator when the holding pin is inserted into the insertion hole of the corresponding tool mounting member, and the tool that is not to be used can be locked with being made to retreat from the second actuator when corresponding one of the locking pins that sandwich the holding pin therebetween is inserted into the insertion hole of the corresponding tool mounting member.

In the above-described aspect, the tool mounting members may each have, in an outer periphery of the insertion hole, a notch portion with which interference with the second actuator is avoided during movement thereof in the first-axis direction in accordance with movement of the first member in the first-axis direction.

By doing so, the second actuator is made to pass through the notch portion when the tool mounting member is moved in the second-axis direction, thereby making it possible to move the tool mounting member to positions on both sides of the second actuator.

In the above-described aspect, the first actuator may be a servomotor.

If the first actuator is formed of a pneumatic cylinder or a hydraulic cylinder, for example, the tool mounting member cannot be stopped at a position in the middle of the movement stroke of the pneumatic cylinder or the hydraulic cylinder. In contrast to this, when the first actuator is formed of a servomotor, the tool mounting member can be stopped at an arbitrary position in the middle of the movement stroke thereof.

According to another aspect, the present invention provides a robot system including: a robot that has an arm to be operated on the basis of a computer program set in advance; the above-described tool switching/holding device, which is mounted on a distal end portion of the arm; and a control unit that controls at least the operations of the first actuator and the second actuator of the tool switching/holding device.

According to this aspect, in the tool switching/holding device mounted on the distal end portion of the arm, through control of the control unit, one of the plurality of tool mounting members is held by the second actuator, and the other tool mounting member is made to retreat by the corresponding retreating/locking section, thereby making it possible to easily perform tool exchange without moving the arm of the robot.

In the above-described aspect, the second members and the tool mounting members may be provided in two pairs; the two retreating/locking sections may be provided; when the control unit causes the second actuator to hold one of the tool mounting members in the two pairs, the control unit may cause the other tool mounting member to be locked by one of the two retreating/locking sections; and, when the control unit causes the second actuator to hold the other tool mounting member in the two pairs, the control unit may cause said one tool mounting member to be locked by the other one of the two retreating/locking sections.

By doing so, the tool mounting members in the two pairs can be alternately held by the second actuator while being alternately locked by the two retreating/locking sections. Therefore, predetermined work can be performed while alternately exchanging the two tools mounted on the tool mounting members in the two pairs.

In the above-described aspect, the second members and the tool mounting members may be provided in three pairs; the two retreating/locking sections may be provided; when the control unit causes the second actuator to hold a first tool mounting member, among the tool mounting members in the three pairs, the control unit may cause second and third tool mounting members to be locked by one of the two retreating/locking sections; when the control unit causes the second actuator to hold the second tool-mounting member, among the tool mounting members in the three pairs, the control unit may cause the first tool mounting member to be locked by the other one of the two retreating/locking sections and causes the third tool mounting member to be locked by said one of the two retreating/locking sections; and, when the control unit causes the second actuator to hold the third tool mounting member, among the tool mounting members in the three pairs, the control unit may cause the first and second tool-mounting members to be locked by the other one of the two retreating/locking sections.

By doing so, even in a case in which the tool mounting members are provided in three pairs, while one of the tool mounting members in the three pairs is selectively held by the second actuator, the other remaining tool mounting members are locked by the two retreating/locking sections. Accordingly, predetermined work can be performed while alternately exchanging the three tools mounted on the tool mounting members in the three pairs.

REFERENCE SIGNS LIST 1 robot system
2 robot
3 arm
5 control unit
10, 10B tool switching/holding device
11 base
12 Y-axis slide base (first member)
13 X-axis slide base (second member)
20, 20A, 20C first tool-mounting member (tool mounting member)

20, 20B, 20D second tool-mounting member (tool mounting member)
20, 20E third tool mounting member (tool mounting member)
24, 24B insertion hole
28 notch portion
30 Y-axis actuator (first actuator)
40 X-axis actuator (second actuator)
44 holding pin
50, 50A first retreating/locking section (retreating/locking section)
50, 50B second retreating/locking section (retreating/locking section)
51 locking pin
100, 100A, 100C first tool (tool)
100, 100B, 100D second tool (tool)
100, 100E third tool (tool)
P1 retracted-end position (prescribed position)

The invention claimed is:

1. A tool switching/holding device comprising:
   a base;
   a first member that is provided so as to be movable along a first-axis direction with respect to the base;
   a first actuator that moves the first member in the first-axis direction with respect to the base;
   a plurality of second members that are provided on the first member and that are each supported so as to be movable in a second-axis direction perpendicular to the first-axis direction;
   a plurality of tool mounting members that are provided on the respective second members and on each of which a tool is mounted;
   a second actuator that selectively holds one of the tool mounting members, which are provided on the plurality of second members, respectively, and that moves the held tool mounting member in the second-axis direction; and
   a plurality of retreating/locking sections that cause, of the plurality of tool mounting members, the tool mounting member or members other than the tool mounting member that is selectively held by the second actuator, to retreat to a position away from the second actuator in the first-axis direction or the second-axis direction and that each lock the retreating tool mounting member.

2. A tool switching/holding device according to claim 1, wherein the tool mounting members each have an insertion hole penetrating therethrough in the first-axis direction;
   the second actuator is provided with a holding pin that extends in the first-axis direction and that can be inserted into the insertion holes of the tool mounting members; and
   the retreating/locking sections are each provided with a locking pin that extends in the first-axis direction and that can be inserted into the insertion holes of the tool mounting members.

3. A tool switching/holding device according to claim 2, wherein the locking pins are provided so as to be positioned coaxially with the holding pin, on both sides of the holding pin when the second actuator positions the holding pin at a prescribed position in the second-axis direction.

4. A tool switching/holding device according to claim 2, wherein the tool mounting members each have, in an outer periphery of the insertion hole, a notch portion with which interference with the second actuator is avoided during movement thereof in the first-axis direction in accordance with movement of the first member in the first-axis direction.

5. A tool switching/holding device according to claim 1, wherein the first actuator is a servomotor.

6. A robot system comprising:
   a robot that has an arm to be operated on the basis of a computer program set in advance;
   a tool switching/holding device according to claim 1, that is mounted on a distal end portion of the arm; and
   a control unit that controls at least the operations of the first actuator and the second actuator of the tool switching/holding device.

7. A robot system according to claim 6,
   wherein the second members and the tool mounting members are provided in two pairs;
   two retreating/locking sections are provided;
   when the control unit causes the second actuator to hold a first of the tool mounting members in the two pairs, the control unit causes the second tool mounting member to be locked by a first of the two retreating/locking sections; and
   when the control unit causes the second actuator to hold the second tool mounting member in the two pairs, the control unit causes said first tool mounting member to be locked by the second of the two retreating/locking sections.

8. A robot system according to claim 6,
   wherein the second members and the tool mounting members are provided in three pairs;
   two retreating/locking sections are provided;
   when the control unit causes the second actuator to hold a first tool mounting member, among the tool mounting members in the three pairs, the control unit causes second and third tool mounting members to be locked by a first of the two retreating/locking sections;
   when the control unit causes the second actuator to hold the second tool-mounting member, among the tool mounting members in the three pairs, the control unit causes the first tool mounting member to be locked by the second of the two retreating/locking sections and causes the third tool mounting member to be locked by said first of the two retreating/locking sections; and
   when the control unit causes the second actuator to hold the third tool mounting member, among the tool mounting members in the three pairs, the control unit causes the first and second tool-mounting members to be locked by the second of the two retreating/locking sections.

* * * * *